United States Patent
Kobayashi et al.

(10) Patent No.: US 8,558,914 B2
(45) Date of Patent: Oct. 15, 2013

(54) IMAGING DEVICE, IMAGING METHOD, AND ELECTRONIC APPARATUS FOR DYNAMICALLY DETERMINING RATIOS OF EXPOSURES TO OPTIMIZE MULTI-STAGE EXPOSURE

(75) Inventors: Masanobu Kobayashi, Shiojiri (JP); Haruhisa Kurane, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 367 days.

(21) Appl. No.: 12/904,574

(22) Filed: Oct. 14, 2010

(65) Prior Publication Data
US 2011/0090361 A1 Apr. 21, 2011

(30) Foreign Application Priority Data
Oct. 21, 2009 (JP) ................. 2009-242817

(51) Int. Cl.
*H04N 5/225* (2006.01)
*H04N 9/04* (2006.01)

(52) U.S. Cl.
USPC .................... 348/229.1; 348/223.1

(58) Field of Classification Search
None
See application file for complete search history.

(56) References Cited

U.S. PATENT DOCUMENTS

| 5,801,773 | A | 9/1998 | Ikeda |
| 5,929,908 | A | 7/1999 | Takahashi et al. |
| 7,239,805 | B2 * | 7/2007 | Uyttendaele et al. ......... 396/222 |
| 2003/0095192 | A1 * | 5/2003 | Horiuchi .................... 348/222.1 |
| 2008/0231730 | A1 * | 9/2008 | Tsuruoka ................... 348/229.1 |
| 2008/0253646 | A1 | 10/2008 | Kobayashi |
| 2008/0267522 | A1 | 10/2008 | Kobayashi |
| 2009/0046947 | A1 | 2/2009 | Kobayashi |
| 2009/0091645 | A1 * | 4/2009 | Trimeche et al. ............. 348/273 |
| 2009/0102946 | A1 * | 4/2009 | Tischer .................... 348/231.99 |
| 2009/0219387 | A1 * | 9/2009 | Marman et al. ............... 348/143 |
| 2010/0033597 | A1 * | 2/2010 | Ikemoto et al. ............. 348/229.1 |

FOREIGN PATENT DOCUMENTS

| JP | A-07-131708 | 5/1995 |
| JP | A-08-214211 | 8/1996 |
| JP | A-2001-352552 | 12/2001 |
| JP | A-2004-048445 | 2/2004 |
| JP | A-2008-263345 | 10/2008 |
| JP | A-2008-276482 | 11/2008 |
| JP | A-2009-049547 | 3/2009 |

* cited by examiner

*Primary Examiner* — John Villecco
*Assistant Examiner* — Dwight C Tejano
(74) *Attorney, Agent, or Firm* — Oliff & Berridge, PLC

(57) ABSTRACT

An imaging device includes: an imaging unit that images a subject with three or more kinds of exposures, ratios of respective pairs of exposures of which adjacent to each other in an ascending order or a descending order are equal; and a combining unit that combines, on the basis of the ratios, pixel signals corresponding to the respective three or more kinds of exposures obtained by imaging the subject with the imaging unit.

8 Claims, 10 Drawing Sheets

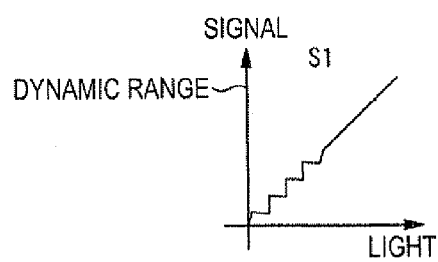 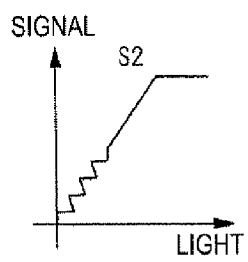 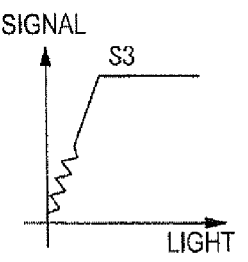
FIG.8A  FIG.8B  FIG.8C
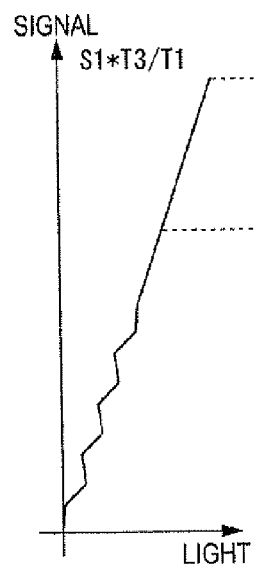 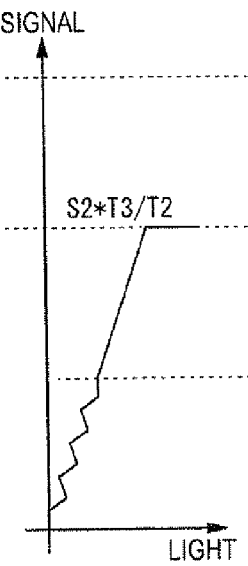 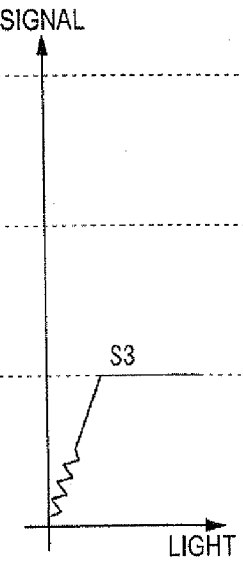 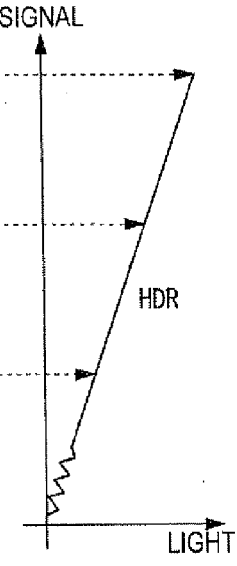
FIG.8D  FIG.8E  FIG.8F  FIG.8G
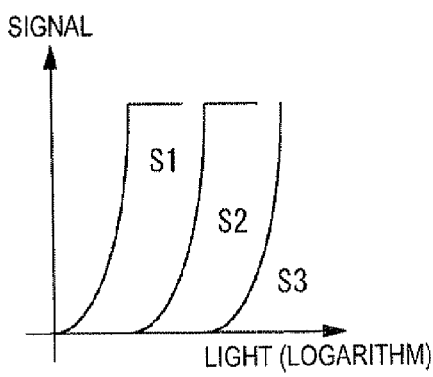
FIG. 9

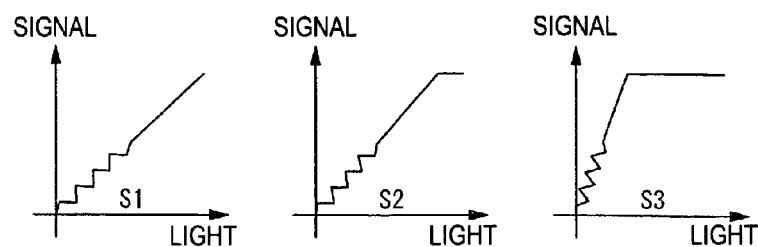
FIG.12A Prior Art    FIG.12B Prior Art    FIG.12C Prior Art
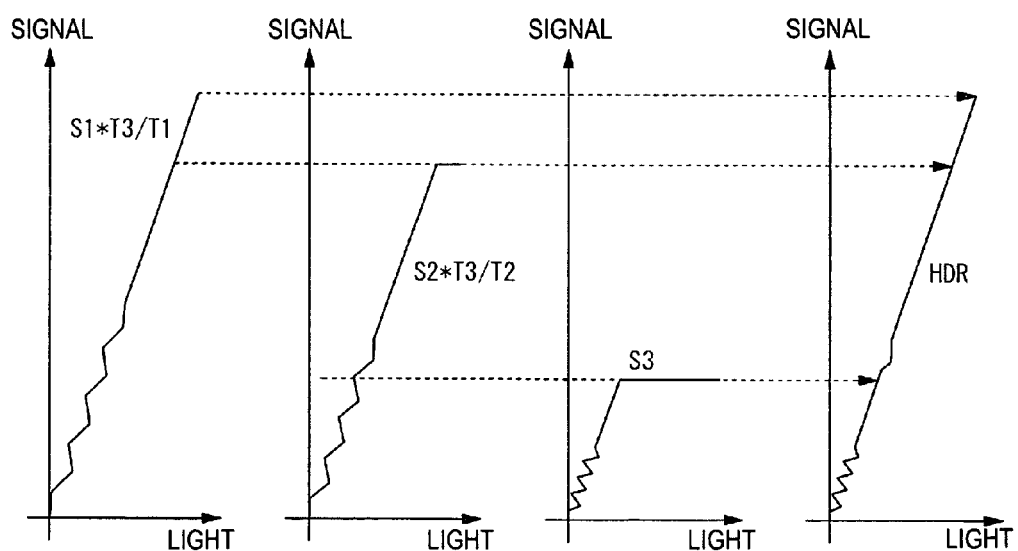
FIG.12D Prior Art    FIG.12E Prior Art    FIG.12F Prior Art    FIG.12G Prior Art

IMAGING DEVICE, IMAGING METHOD, AND ELECTRONIC APPARATUS FOR DYNAMICALLY DETERMINING RATIOS OF EXPOSURES TO OPTIMIZE MULTI-STAGE EXPOSURE

This application claims priority based on Japanese Patent Application No. 2009-242817, filed on Oct. 21, 2009, which is incorporated in this specification.

BACKGROUND

1. Technical Field

An aspect of the present invention relates to an imaging device, an imaging method, an electronic apparatus, and the like suitable for combining plural kinds of picked-up image data having different exposures and generating image data having an expanded dynamic range.

2. Related Art

In the related art, there is a technique for imaging the same subject with plural kinds of exposures (exposure times), combining pixel signals obtained by the imaging respectively corresponding to the plural kinds of exposures, and generating image data having an expanded dynamic range (HDR image data). In such a technique, noise (a false color, a pseudo contour, etc.) often occurs in a boundary area between an image portion corresponding to each of the exposures and image portions corresponding to the other exposures in a combined image.

For example, it is assumed that the same subject is imaged in exposure times T1, T2, and T3 (T1<T2<T3) corresponding to exposures L1, L2, and L3 (L1<L2<L3) and pixel signals S1, S2, and S3 of light response shown in FIGS. 8A to 8C are obtained. In this case, as shown in FIGS. 8D to 8F, first, with reference to the pixel signal S3 having the longest exposure time, the pixel signals S1 and S2 are multiplied by coefficients "T3/T1" and "T3/T2" to normalize the pixel signals S1 and S2. The normalized pixel signals "S1×T3/T1" and "S2×T3/T2" and the pixel signal S3 are linearly combined. Consequently, as shown in FIG. 8G, a picked-up image signal having an expanded dynamic range (having high S/N) is obtained.

However, during imaging, in some case, images are picked up by different light responses in a set exposure time because of an external factor such as offset fluctuation. In such a case, it is likely that the coefficient values "T3/T1" and "T3/T2" are inappropriate and the linearity of a picked-up image signal after combination is distorted. When the linearity is distorted, noise as a cause of a false color, a pseudo contour, or the like occurs in connecting portions of a polygonal line shown in FIG. 11.

In order to solve such problems, in JP-A-7-131708 (Patent Document 1), an accurate light response gradient of a picked-up image is calculated. In JP-A-2001-352552 (Patent Document 2), gradients are corrected to coincide with each other taking into account an OB area (an offset level) of a camera. In JP-A-08-214211 (Patent Document 3), an accurate ratio of exposures is calculated by analyzing a histogram of an image. As a method of not analyzing a characteristic of an image, in JP-A-2004-48445 (Patent Document 4), a low-pass filter is applied near a boundary area of a combined image to relax unnaturalness.

Even when accurate exposures (exposure ratios) of images are known and the images are multiplied by an appropriate coefficient to be combined, if a ratio itself of T1:T2:T3 during imaging is inappropriate, in some case, a noise component due to an S/N limit of a sensor occurs in an image after the combination.

For example, as shown in FIGS. 8D to 8G, if exposure times are set in a relation in which a noise region (a wavy line portion in the figure) of the pixel signal S1 is supplemented by the pixel signal S2 and a noise region of the pixel signal S2 is supplemented by the pixel signal S3, the problem does not occur. However, as shown in FIGS. 12D to 12G, when the exposure time T2 is slightly short, the noise region of the pixel signal S2 cannot be sufficiently supplemented by the pixel signal S3 and noise occurs near a boundary between the pixel signals S2 and S3.

However, in related arts including Patent Documents 1 to 4, there is no method for theoretically and dynamically determining ratios of exposures with respect to optimization of multi-stage exposure including three or more stages.

SUMMARY

An advantage of some aspects of the invention is to provide an imaging device, an imaging method, and an electronic apparatus suitable for theoretically and dynamically determining ratios of exposures in multi-state exposure.

According to an aspect of the invention, an imaging device includes: an imaging unit that images a subject with three or more kinds of exposures, ratios of respective pairs of exposures of which adjacent to each other in an ascending order or a descending order are equal; and a combining unit that combines, on the basis of the ratios, pixel signals corresponding to the respective three or more kinds of exposures obtained by imaging the subject with the imaging unit.

With such a configuration, the imaging unit images the subject with the three or more kinds of exposures, ratios of respective pairs of exposures of which adjacent to each other in an ascending order or a descending order are equal. When the subject is imaged with the three or more kinds of exposures, the combining unit combines pixel signals corresponding to the respective three or more kinds of exposures on the basis of the ratios.

Specifically, for example, when the subject is imaged with three kinds of exposures L1, L2, and L3 (L1<L2<L3), ratios of respective pairs of exposures adjacent to each other in an ascending order in this way can be represented as "L2/L1" and "L3/L2". When the ratios are equal, "L2/L1=L3/L2". To satisfy this relation, for example, an iris (an aperture of a lens), imaging sensitivity, exposure times, and the like are adjusted according to functions of the imaging unit. For example, when the exposure times are adjusted, if a relation between the exposures and the exposure times is linear, the ratios of respective pairs of exposures adjacent to each other in can also be represented by ratios of the exposure times. Specifically, the ratios of the exposures can be represented as "T2/T1 and "T3/T2".

When the ratios of the exposures are equalized, light responses (output pixel signal levels) of the imaging unit with respect to an incident light amount (a logarithm) can be arranged at equal intervals. Consequently, since an exposure ratio of images to be combined is always fixed, a change in brightness over a dark section to a bright section is equal. There is an effect that an image with little occurrence of noise can be obtained.

The equal change in brightness includes not only a completely equal change in brightness but also a change in brightness deviating from the completely equal change in brightness as long as the effect of this aspect can be shown. This is the same in other aspects explained below.

In the imaging device according to the aspect, when the three or more kinds of exposures are represented as L1, L2, ..., and Ln (n is a natural number equal to or larger than 3 and L1<L2< ... <Ln), the imaging unit may image the subject in exposure times T1, T2, ..., and Tn (T1<T2< ... <Tn) in which ratios of respective pairs of exposures adjacent to each other "L2/L1, ..., Ln/L(n−1)" are equal (L2/L1= ... Ln/L(n−1)).

With such a configuration, for example, an iris (an aperture of a lens), imaging sensitivity, exposure times, and the like can be adjusted according to functions of the imaging unit to set the ratios of the exposures "L2/L1, ..., and Ln/L(n−1)" equal (L2/L1= .... =Ln/L(n−1)).

Consequently, an exposure ratio of images to be combined is always fixed and, in an image after combination, a change in brightness over a dark section to a bright section is equal. There is an effect that an image with little occurrence of noise can be obtained.

The imaging device according to the aspect may further includes: a selecting unit that selects any one determination method out of plural kinds of exposure determination methods for determining the three or more kinds of exposures; and an exposure determining unit that determines the three or more kinds of exposures on the basis of the determination method selected by the selecting unit. The imaging unit may image the subject with the three or more kinds of exposures determined by the exposure determining unit.

With such a configuration, the selecting unit selects any one determination method out of the plural kinds of exposure determination methods. When the determination method is selected, the exposure determining unit determines, using the selected determination method, the three or more kinds of exposures, ratios of respective pairs of exposures of which adjacent to each other in an ascending order or a descending order are equal. When the three or more kinds of exposures are determined, the imaging unit images the subject with the determined exposures.

Therefore, a user can select arbitrary one out of plural kinds of determination methods such as a determination method with priority given to image quality and a determination method with priority given to a range. The user can cause the imaging device to image the subject with the three or more kinds of exposures determined by the selected determination method.

In the imaging device according to the aspect, the determination methods include a method of setting a maximum exposure and a minimum exposure among the three or more kinds of exposures, calculating an intermediate exposure of exposures, the ratios of the respective pairs of exposures adjacent to each of which are equal, on the basis of the set maximum exposure and minimum exposure, and determining the three or more kinds of exposures.

With such a configuration, it is possible to set, on the basis of a dynamic range or the like, a maximum and a minimum of exposures to calculate an intermediate exposure, and determine the three or more kinds of exposures, ratios of respective pairs of exposures of which adjacent to each other in an ascending order or a descending order are equal.

In other words, it is possible to set an arbitrary range (desired maximum and minimum) in a range of a dynamic range that the imaging device can realize. Consequently, it is possible to cause the imaging device to automatically determine, in a range determined by the set maximum and minimum, the three or more kinds of exposures, ratios of respective pairs of exposures of which adjacent to each other in an ascending order or an descending order are equal.

In the imaging device according to the aspect, the imaging device may further include: an exposure setting unit that sets a maximum exposure and a minimum exposure among the three or more kinds of exposures; and an exposure determining unit that calculates, on the basis of the maximum exposure and the minimum exposure set by the exposure setting unit, an intermediate exposure of exposures, the ratios of the respective pairs of exposures adjacent to each of which are equal, and determines the three or more kinds of exposures.

With such a configuration, when a maximum and a minimum of exposures are set by the exposure setting unit, the exposure determining unit determines the three or more kinds of exposures, ratios of respective pairs of exposures of which adjacent to each other in an ascending order or a descending order are equal.

In other words, it is possible to set an arbitrary range (desired maximum and minimum) in a range of a dynamic range that the imaging device can realize. Consequently, it is possible to cause the imaging device to automatically determine, in a range determined by the set maximum and minimum, the three or more kinds of exposures, ratios of respective pairs of exposures of which adjacent to each other in an ascending order or an descending order are equal.

In the imaging device according to the aspect, when the imaging device images the subject with the three kinds of exposures L1, L2, and L3 (L1<L2<L3), the exposure determining unit calculates the exposure L2, which is the intermediate exposure, according to the following Formula (1).

$$L2 = L1 \times (L3/L1)^{1/2} \quad (1)$$

With such a configuration, by setting desired minimum and maximum, it is possible to easily calculate, according to Formula (1), an intermediate exposure of exposures, the ratios of the respective pairs of exposures adjacent to each of which in an ascending order or a descending order are equal.

The imaging device according to the aspect further includes an exposure adjusting unit that adjusts, on the basis of information concerning brightness of an imaging environment, while keeping the ratios of the respective pairs of exposures adjacent to each other equal, a control amount for an exposure of the imaging unit such that the three or more kinds of exposures are exposures suitable for the brightness of the imaging environment.

With such a configuration, the exposure adjusting unit can adjust, according to information related to the brightness of the imaging environment, while keeping the ratios of the respective pairs of exposures adjacent to each other equal, the three or more kinds of exposures to exposures suitable for the brightness of the imaging environment.

Consequently, it is possible to adjust, according to a bright environment, a dark environment, or the like, an exposure to an exposure suitable for the brightness of the imaging environment while keeping the ratios equal. Therefore, a change in brightness over a dark section to a bright section is equal. There is an effect that it is possible to set an exposure more suitable for the imaging environment while maintaining an effect that an image with little occurrence of noise can be obtained.

The control amount for the exposure of the imaging unit corresponds to a control amount such as an iris (an aperture of a lens), imaging sensitivity, or exposure times.

According to another aspect of the invention, an imaging method includes: imaging a subject with three or more kinds of exposures, ratios of respective pairs of exposures of which adjacent to each other in an ascending order or a descending order are equal; and combining, on the basis of the ratios, pixel signals corresponding to the respective three or more kinds of exposures obtained by imaging the subject.

With such a configuration, it is possible to obtain actions and effects equivalent to those in the aspect explained above.

According to still another aspect of the invention, an electronic apparatus includes the imaging device according to the aspect explained above.

With such a configuration, it is possible to obtain actions and effects equivalent to those of the imaging device according to the aspect.

BRIEF DESCRIPTION OF THE DRAWINGS

The invention will be described with reference to the accompanying drawings, wherein like numbers reference like elements.

FIGS. 8A to 8G are diagrams showing examples of response signals to incident lights in exposure times determined such that ratios of the response signals are equal, a normalization signal, and a combined signal.

FIG. 9 is a diagram representing axes of the incident lights in FIGS. 8A to 8C with logarithms.

FIGS. 12A to 12G are diagrams showing examples of the response signals to incident lights in the exposure times with an inappropriate exposure ratio, normalization signal, and a combined signal.

DESCRIPTION OF EXEMPLARY EMBODIMENTS

First Embodiment

A first embodiment of the invention is explained below with reference to the accompanying drawings. FIGS. 1A to 1C to FIG. 9 are diagrams showing the first embodiment of an imaging device, an imaging method, and an electronic apparatus according to the invention.

Figure 1A:
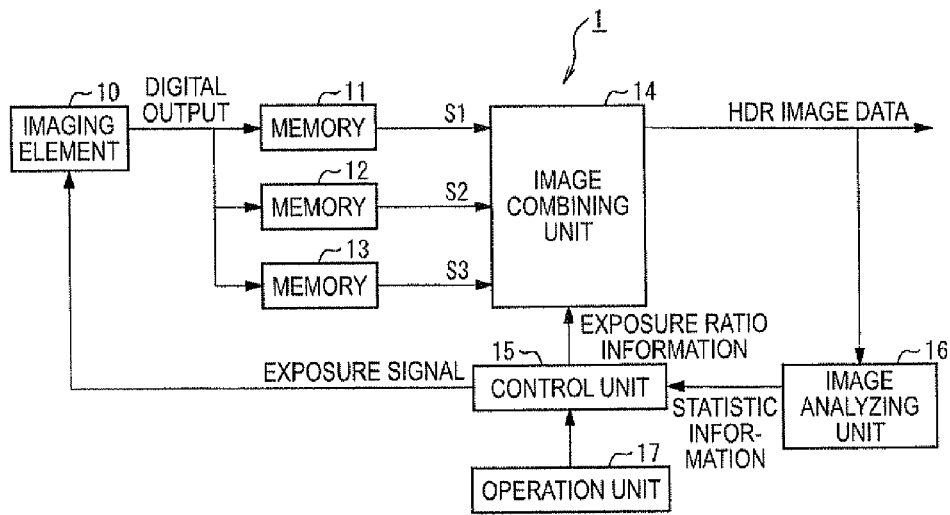
FIGS. 1A to 1C are block diagrams showing the configuration of an imaging device according to the invention.
Figures 1B, 1C:
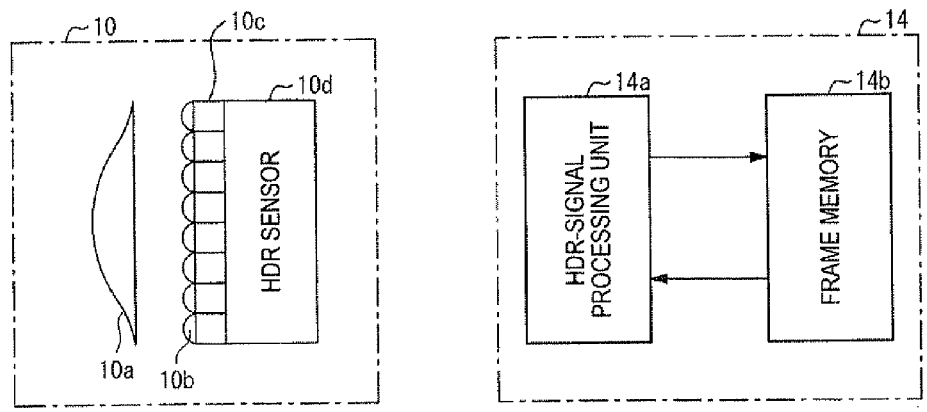

First, the configuration of the imaging device according to the invention is explained with reference to FIGS. 1A to 1C. FIG. 1A is a block diagram showing the configuration of an imaging device 1 according to the invention. FIG. 1B is a schematic diagram showing the configuration of an imaging element 10. FIG. 1C is a block diagram showing the configuration of an image combining unit 14.

The imaging device 1 includes, as shown in FIG. 1A, the imaging element 10, memories 11 to 13, the image combining unit 14, a control unit 15, an image analyzing unit 16, and an operation unit 17.

The imaging element 10 has a function of imaging a subject with three or more kinds of exposures. The imaging element 10 includes, as shown in FIG. 1B, a lens 10a, micro lenses 10b, a color filter array 10c, and an HDR sensor 10d.

In the following explanation of the configuration, for convenience of explanation, it is assumed that the imaging element 10 performs imaging in exposure times T1, T2, and T3 (T1<T2<T3) corresponding to three kinds of exposures L1, L2, and L3 (L1<L2<L3). It goes without saying that exposures are not limited to three kinds and may be four or more kinds.

The lens 10a collects reflected light from a subject and leads the reflected light to the micro lenses 10b. There are types such as a single focus lens, a zoom lens, and an auto iris lens according to imaging conditions or the like.

The micro lenses 10b collect light transmitted through the lens 10a on sensor cells (pixels) of a sensor cell array of the HDR sensor 10d.

The color filter array 10c includes color filer sections (hereinafter referred to as CF sections) that separate light having a wavelength corresponding to predetermined one kind of color element from light transmitted through the micro lenses 10b and make the separated light incident on the pixels. The number of the color filter sections is at least equivalent to the number of the pixels.

The HDR sensor 10d controls the exposure times T1 to T3 with an electronic shutter system and outputs three kinds of digital image data having different exposures.

The memories 11 to 13 play a role of buffers that temporarily store image data corresponding to the three kinds of exposures L1 to L3 obtained by imaging the subject in the different plural exposure times T1 to T3 in the imaging element 10 and output the image data to the image combining unit 14 in synchronization with one another.

The image combining unit 14 includes, as shown in FIG. 1C, an HDR-signal processing unit 14a and a frame memory 14b.

Although not shown in the figure, the HDR-signal processing unit 14a includes a preprocess unit, a combination processing unit, and a memory interface (hereinafter referred to as memory IF).

The preprocess unit applies fixed pattern noise removal processing, clamp processing, and the like to pixel signals (digital pixel data S1 to S3) from the memories 11 to 13.

The combination processing unit performs HDR combination processing on the basis of image data from the memories 11 to 13 and exposure ratio information from the control unit 15. The combination processing unit stores the image data after the HDR combination processing in the frame memory 14b as HDR image data via the memory IF.

The memory IF has a function of arbitrating writing of data in and readout of data from the frame memory 14b. Specifically, the memory IF arbitrates a data readout request and a data writing request from the preprocess unit and the combination processing unit such that reading and writing are normally performed in response to the data readout request and the data writing request. The memory IF executes processing for reading out data from the frame memory 14b and processing for writing data in the frame memory 14b.

The frame memory 14b is a memory that stores the HDR image data after the combination in the HDR-signal processing unit 14a.

The control unit 15 has a function of generating exposure ratio information on the basis of input information from the operation unit 17, a function of adjusting a present exposure ratio to be an appropriate exposure ratio on the basis of statistic information acquired from the image analyzing unit 16, and a function of outputting the generated exposure ratio information to the image combining unit 14.

Further, the control unit 15 has a function of generating an exposure signal on the basis of exposure ratio information corresponding to an exposure ratio after adjustment or exposure ratio information generated anew and transmitting the generated exposure signal and various control signals to the imaging element 10. The various control signals include a vertical synchronization signal, a horizontal synchronization signal, and a pixel clock.

Specifically, the imaging element 10 according to this embodiment images the same subject in the exposure times T1 to T3 corresponding to the three kinds of exposures L1 to L3 corresponding to an exposure signal output from the control unit 15.

In this embodiment, the control unit 15 sets the exposure times T1 to T3 corresponding to the exposures L1 to L3 such that ratios "L2/L1" and "L3/L2" of respective pairs of exposures adjacent to each other in the exposures L1, L2, and L3 arranged in an ascending order are equal (L2/L1=L3/L2).

In this embodiment, the control unit 15 adjusts an exposure ratio to be an optimum ratio according to the brightness of an imaging environment. For the adjustment, the control unit 15 compares an average luminance value Lav of HDR image data obtained from the image analyzing unit 16 and each of a threshold Lth on a high luminance side and a threshold Lt1 on a low luminance side prepared in advance.

According to a result of the comparison, when the average luminance value Lav is larger than the threshold Lth, the control unit 15 determines that the imaging environment is relatively bright. When the average luminance value Lav is smaller than the threshold Lt1, the control unit 15 determines that the imaging environment is relatively dark. Further, the control unit 15 performs adjustment to have an optimum exposure ratio with respect to the brightness of the imaging environment by increasing or decreasing, on the basis of the determination result, the exposure times T1 to T3 set at present while keeping a state in which the ratios of the exposures is kept equal.

The image analyzing unit 16 has a function of calculating statistic information concerning the brightness of the imaging environment on the basis of the HDR image data generated by the image combining unit 14 and outputting the calculated statistic information to the control unit 15. Specifically, the image analyzing unit 16 statistically analyzes, in continuous imaging of plural frames, the HDR image data (including at least HDR image data for a first frame) obtained from the image combining unit 14. In this embodiment, to obtain information concerning the brightness of the imaging environment, the image analyzing unit 16 calculates the average luminance value Lav of the HDR image data as the statistic information. The image analyzing unit 16 outputs the calculated average luminance value Lav to the control unit 15.

The operation unit 17 is operated by a user when the user selects an arbitrary mode among plural kinds of imaging modes during imaging or during viewing of a picked-up image. The operation unit 17 has a function of outputting information corresponding to content of the operation by the user to the control unit 15.

Figure 2:
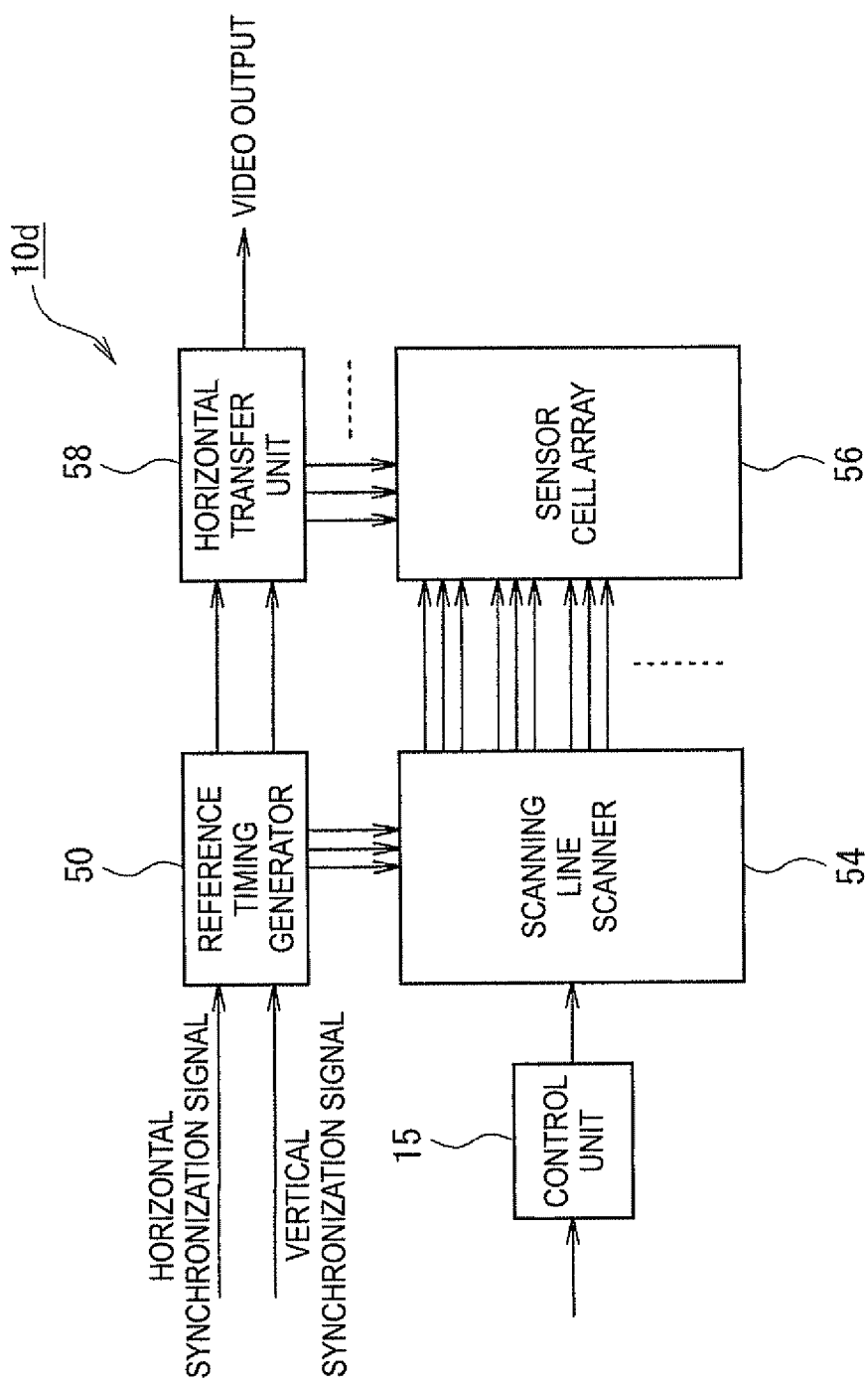
FIG. 2 is a block diagram showing the configuration of an imaging element.

The configuration of the HDR sensor 10d of the imaging element 10 is explained with reference to FIG. 2. FIG. 2 is a block diagram showing the configuration of the HDR sensor 10d.

The HDR sensor 10d includes, as shown in FIG. 2, a reference timing generator 50, a scanning line scanner 54, a sensor cell array 56, and a horizontal transfer unit 58.

The reference timing generator 50 generates a reference timing signal on the basis of a vertical synchronization signal and a horizontal synchronization signal from the control unit 15 and outputs the reference timing signal to the scanning line scanner 54.

The scanning line scanner 54 generates, on the basis of various signals from the reference timing generator 50 and the control unit 15, a reset line selection signal for activating a line on which reset processing is performed. The scanning line scanner 54 outputs the generated reset line selection signal to the sensor cell array 56.

Further, the scanning line scanner 54 generates a readout line selection signal for activating, as a readout line for a pixel signal, the reset line on which charges are accumulated in a set exposure time. The scanning line scanner 54 outputs the generated readout line selection signal to the sensor cell array 56.

The sensor cell array 56 includes a light receiving area in which plural sensor cells (pixels) formed by using a CMOS technique including a light receiving element (a photodiode, etc.) are disposed in a two-dimensional matrix shape. An address line, a reset line, and a readout line are connected in common to lines of the pixels.

When various driving signals (selection signals) are transmitted to the sensor cells forming the lines via the three control lines and the address line and the readout line are activated, the sensor cell array 56 transfers (outputs) accumulated charges (pixel signals) to the horizontal transfer unit 58 via a signal line.

With such a configuration, the sensor cell array 56 activates (selects), on the basis of a selection signal supplied from the scanning line scanner 54, through the address line, a line of pixels that the sensor cell array 56 causes to perform a reset operation or a readout operation. The sensor cell array 56 inputs via a reset line, when the sensor cell array 56 causes the pixels of the line selected by the selection signal to perform the reset operation, a signal for instructing the reset operation to the pixels. The sensor cell array 56 inputs, when the sensor cell array 56 causes the pixels to perform readout of pixel signals, a signal for instructing transfer of accumulated charges via the readout line. Further, in the pixels selected by the selection signal, the reset operation is performed when the signal for instructing the reset operation is input. The transfer of the accumulated charges to the horizontal transfer unit 58 is performed via the signal line when the signal for instructing the transfer of the accumulated charges is input.

The horizontal transfer unit 58 A/D-converts data of pixel signals (analog signals) read out from the pixels of the sensor cell array 56 and sequentially outputs the data to the memories 11 to 13 in a line unit in series.

An internal configuration of the scanning line scanner 54 is explained with reference to FIG. 3.

Figure 3:
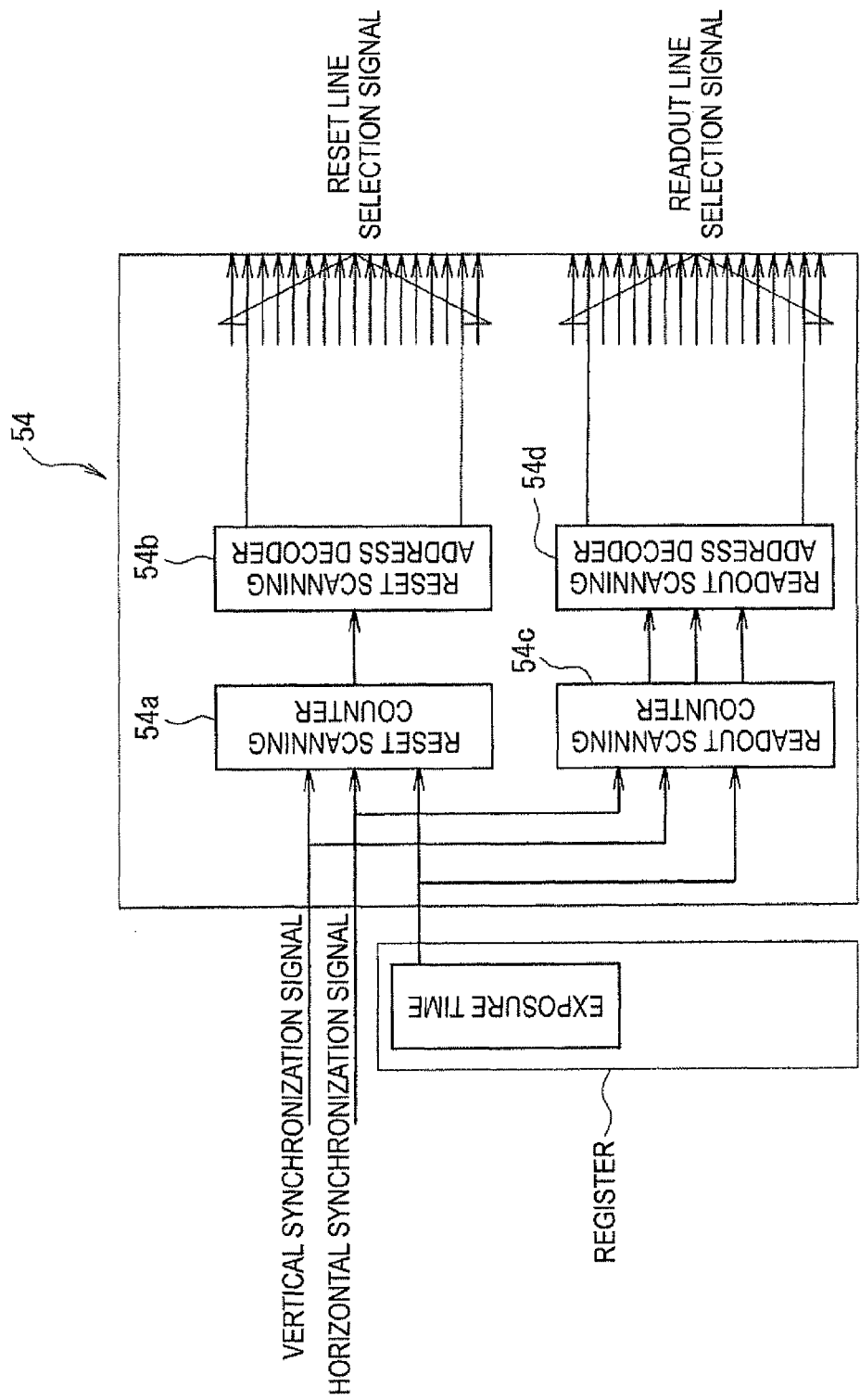
FIG. 3 is a block diagram showing a detailed configuration of a scanning line scanner.

FIG. 3 is a block diagram showing the internal configuration of the scanning line scanner 54.

The scanning line scanner 54 includes, as shown in FIG. 3, a reset scanning counter 54a, a reset scanning address decoder 54b, a readout scanning counter 54c, and a readout scanning address decoder 54d.

The reset scanning counter 54a repeats a count-up operation on the basis of the vertical synchronization signal and the horizontal synchronization signal from the reference timing generator 50 and information concerning exposures (exposure times) included in the exposure signal from the control unit 15. A count value of the reset scanning counter 54a corresponds to line numbers of the pixels of the sensor cell array 56. The information concerning the exposure times T1 to T3 included in the exposure signal is written in an internal register of the scanning line scanner 54.

When a count operation is executed, the reset scanning counter 54a counts up by 1 at a time from an initial value of the counter and outputs count values to the reset scanning address decoder 54b.

A count value loops in a range from a minimum line number to a maximum line number (e.g., numbers of lines at the bottom and at the top of the light receiving area of the sensor cell array 56). For example, the count value is counted up by 1 at a time from the minimum line number and, when the count value is counted up 1 after reaching the maximum line number, the count value is reset and returns to the minimum line number (e.g., "1"). The same applies to counters of the readout scanning counter 54c.

The reset scanning address decoder 54b generates a reset line selection signal for selecting and activating, as a "reset line R", a line of a line number output from the reset scanning counter 54a and outputs the reset line selection signal to the sensor cell array 56. Consequently, only the selected line is activated and the other lines are inactivated.

The readout scanning counter 54c has three counters respectively corresponding to the exposure times T1 to T3. The counters repeat, on the basis of the vertical synchronization signal and the horizontal synchronization signal from the reference timing generator 50 and the information concerning the exposure times T1 to T3 written in the register, a count-up operation same as that of the reset scanning counter 54a at timing corresponding to the exposure times.

Specifically, the counters of the readout scanning counter 54c start count-up at count intervals corresponding to the exposure times with respect to reset timing, count up by 1 at a time in order from initial values of the counters, and output count values to the readout scanning address decoder 54d.

The readout scanning address decoder 54d generates a readout line selection signal for selecting and activating, as "readout lines L1 to Ln", lines of line numbers output from the counters of the readout scanning counter 54c and outputs the readout line selection signal to the sensor cell array 56. Consequently, only the selected lines are activated and the other lines are inactivated.

Figure 4:
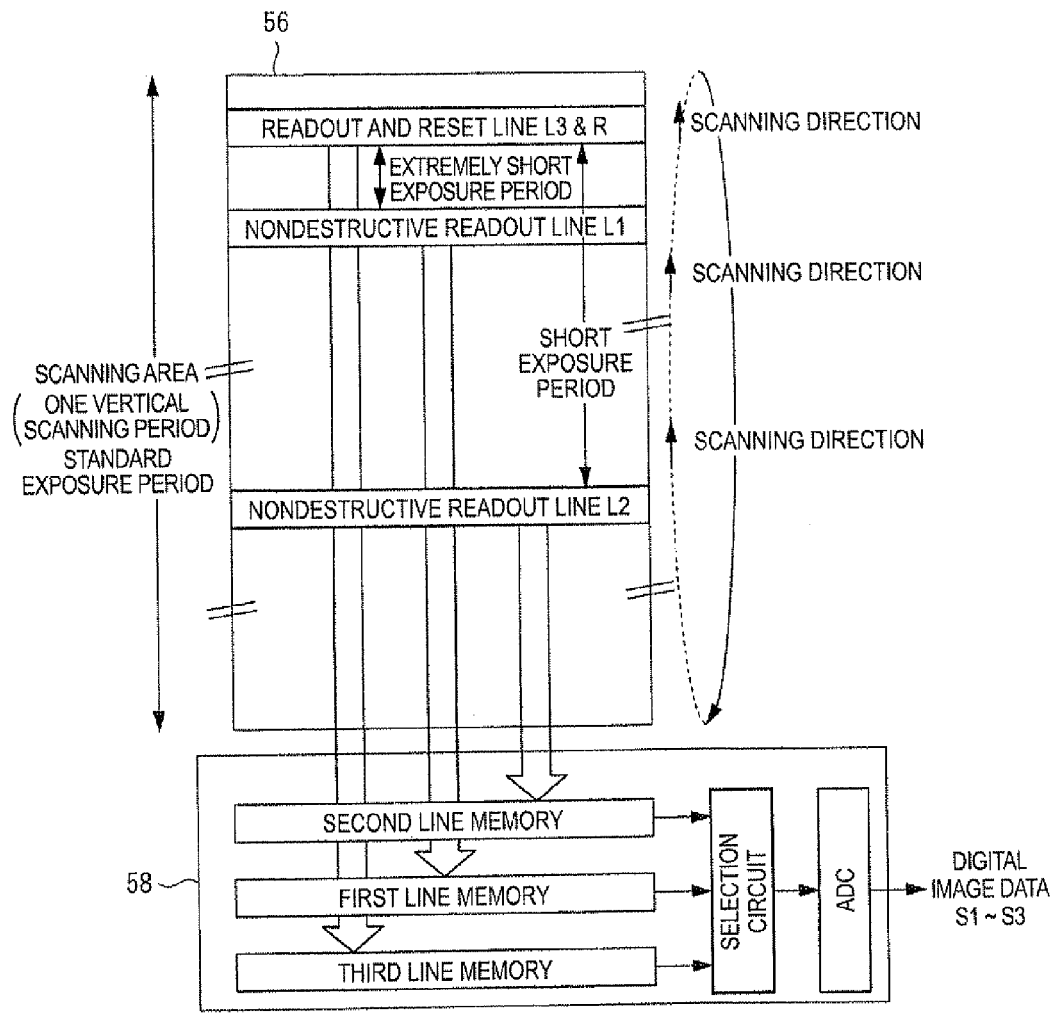
FIG. 4 is a diagram showing an example of exposure for each line of pixels in a sensor cell array and a pixel signal readout operation.
Figure 5:
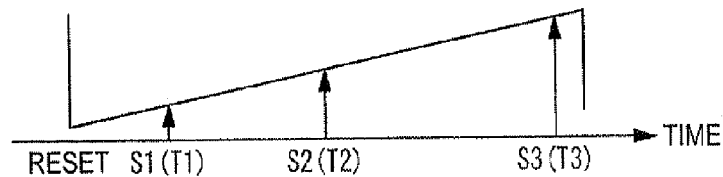
FIG. 5 is a diagram showing an example of reset timing for accumulated charges and readout timing for pixel signals in exposure times.

A method of controlling exposure times of the HDR sensor of the imaging element 10 and a method of reading out pixel signals from the sensor cell array are explained with reference to FIGS. 4 and 5. FIG. 4 is a diagram showing an example of exposure for each line of the pixels in the sensor cell array of the HDR sensor and a pixel signal readout operation. FIG. 5 is a diagram showing an example of reset timing for accumulated charges and readout timing for pixel signals in exposure times.

In this embodiment, a nondestructive readout line L1 for performing nondestructive readout of a pixel signal in the exposure time T1 and a nondestructive readout line L2 for performing nondestructive readout of a pixel signal in the exposure time T2 are set with respect to an exposure area (a scanning area) of the sensor cell array 56. Further, a readout and reset line L3&R for performing reset of accumulated charges of the lines of the pixels and readout of a pixel signal in the exposure time T3 is set. A relation of T1 to T3 is "T1<T2<T3" as shown in FIG. 5. After the reset, first, the nondestructive readout line L1 is set when the exposure time T1 elapses. The nondestructive readout line L2 is set when the exposure time T2 elapses. The readout and reset line L3&R is set when the exposure time T3 elapses.

Specifically, as shown in FIG. 4, when electric charges for the exposure time T3 are sequentially accumulated in the lines of the pixels in the exposure area, the nondestructive readout lines L1 and L2 and the readout and reset line L3&R are set such that the readout and reset line L3&R sequentially reads out pixel signals of the lines of the pixels and sequentially resets the accumulated charges. On the other hand, in the lines of the pixels after the reset of the exposure area, the nondestructive readout lines L1 and L2 are set to sequentially reads out, in a nondestructive manner, pixel signals of the lines of the pixels in the exposure time T1 and the exposure time T2 in a period in which electric charges for the exposure time T3 are accumulated.

For example, it is assumed that readout and reset of the pixel signal S3 in the exposure time T3 are performed in a first line that is a first line in the exposure area. Thereafter, every time the pixel signal S3 is read out from a third line memory, scanning of the readout and reset line L3&R is sequentially performed line by line in a scanning direction in FIG. 4. The scanning is performed such that the readout and reset line L3&R reaches the first line again at exact timing when the exposure time T3 elapses. In such a procedure, readout of a pixel signal during exposure and reset of accumulated charges are sequentially performed in the exposure time T3 in each of the lines of the pixels.

On the other hand, when the accumulated charges are reset, with respect to the lines of the pixels after the reset, nondestructive readout of the pixel signal S1 of a pixel in which the exposure in the exposure time T1 is performed is performed in the nondestructive readout line L1. Subsequently, nondestructive readout of the pixel signal S2 of a pixel in which the exposure in the exposure time T2 is performed is performed in the nondestructive readout line L2. In such a procedure, with respect to the lines of the pixels of the sensor cell array 56, the nondestructive readout of the pixel signals S1 and S2 during the exposure in the exposure time T1 and the exposure time T2 is sequentially performed for each of the lines.

In this embodiment, as shown in FIG. 4, data (analog data) S1 of the pixel signal corresponding to the exposure time T1 is read out to a first line memory and data (analog data) S2 of the pixel signal corresponding to the exposure time T2 is read out to a second line memory. Data (analog data) S3 of the pixel signal corresponding to the exposure time T3 is read out to a third line memory. As shown in FIG. 4, the read-out data S1 to S3 of the pixel signals (hereinafter referred to as pixel data S1 to S3) are sequentially output to an ADC through a selection circuit in order of S1 to S3 and converted into digital data in the ADC. The converted pixel data S1 to S3 are respectively output to the memories 11, 12, and 13 in order of the conversion (in order of S1 to S3).

Figure 6:
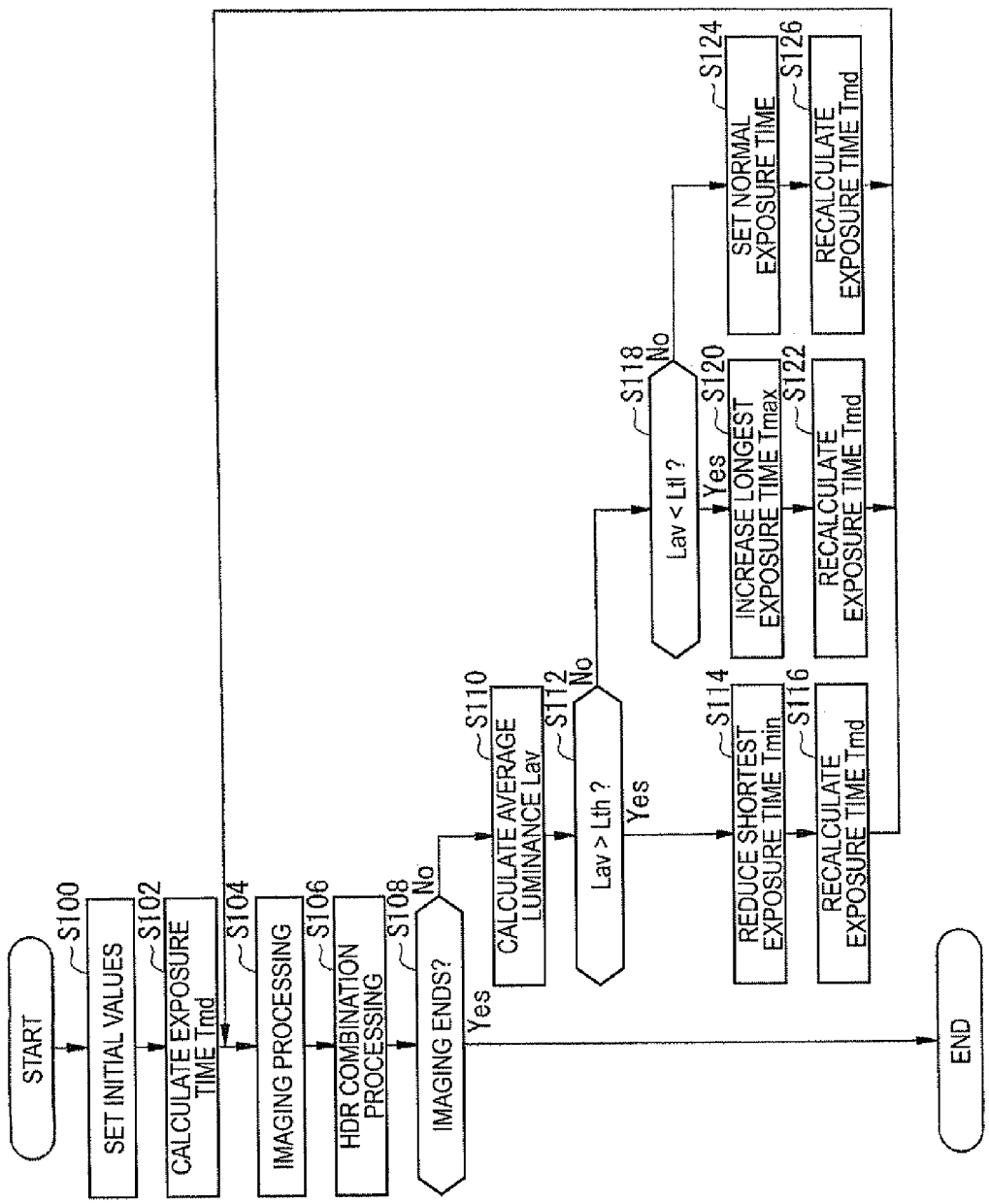
FIG. 6 is a flowchart for explaining exposure control processing.

A flow of exposure control processing in the control unit 15 is explained with reference to FIG. 6. FIG. 6 is a flowchart for explaining the exposure control processing.

When the exposure control processing is started, as shown in FIG. 6, first the control unit 15 shifts to step S100.

In step S100, the control unit 15 sets initial values of a shortest exposure time Tmin and a longest exposure time Tmax and shifts to step S102. For the setting of the initial values, the control unit 15 may use values input or selected by the user via the operation unit 17 or may use initial values set in advance as standard exposure time.

In step S102, the control unit 15 calculates an exposure time Tmd, which is an exposure time corresponding to an intermediate exposure, using the initial values set in step S100 and generates exposure ratio information on the basis of the calculated exposure time Tmd and the shortest exposure time Tmin and the longest exposure time Tmax set as the initial values. The control unit 15 generates an exposure signal on the basis of the generated exposure ratio information, outputs the generated exposure ratio information to the image combining unit 14, transmits the generated exposure signal and various control signals to the imaging element 10, and shifts to step S104.

In this embodiment, since types of exposures are the three types L1 to L3, the shortest exposure time Tmin corresponding to the exposure L1 is the exposure time T1 and the longest exposure time Tmax corresponding to the exposure L3 is the exposure time T3. The intermediate exposure time Tmid corresponding to the exposure L2 is the exposure time T2. The control unit 15 calculates, according to the following Formula (2), the intermediate exposure time T2 that satisfies "T2/T1=T3/T2".

$$T2 = T1 \times (T3/T1)^{1/2} \quad (2)$$

For example, when the shortest exposure time Tmin that can be set is 1 H and the longest exposure time Tmax is 1000 H, with T1=1 H and T3=1000 H, "T2=1×(1000/1)$^{1/2}$≅32" can be calculated from Formula (2). Consequently, exposure ratio=exposure time ratio="1:32:1000" is calculated. In this case, a dynamic range that can be expanded by HDR combination is "60[dB]".

A scanning time for one line in the sensor cell array 56 is represented as 1 H from the initial letter of HSYNC representing a horizontal synchronization signal. For example, when a frame rate is 30 [fps] with respect to 500 as a total number of the sensor cell array 56, a period of 1 H is time obtained by dividing 1/30 second by 500 lines, i.e., 1/15000 second, in other words, 1/15 millisecond (about 67 microseconds).

In step S104, the imaging element 10 executes, on the basis of the exposure signal and the various control signals from the control unit 15, processing for imaging a subject with the exposures L1 to L3 (the exposure times T1 to T3). The imaging element 10 sequentially outputs the image data S1 to S3 obtained by the imaging to the memories 11 to 13 and shifts to step S106.

In step S106, the image combining unit 14 executes the HDR combination processing on the basis of the image data S1 to S3 sequentially output from the memories 11 to 13 and the exposure ratio information (T1:T2:T3) from the control unit 15. The control unit 15 shifts to step S108.

In step S108, the control unit 15 determines whether the imaging processing ends in the imaging element 10. When the control unit 15 determines that the imaging processing ends (Yes), the control unit 15 ends the series of processing. When the control unit 15 determines that the imaging processing does not end (No), the control unit 15 shifts to step S110.

When the control unit 15 shifts to step S110, the control unit 15 acquires HDR image data generated by the HDR combination processing from the frame memory 14b of the image combining unit 14, calculates the average luminance value Lav from the acquired HDR image data, and shifts to step S112.

In step S112, the control unit 15 compares the average luminance value Lav calculated in step S110 and the threshold Lth on the high luminance side of the average luminance value set in advance and determines whether the average luminance value Lav is larger than the threshold Lth. When the control unit 15 determines that the average luminance value Lav is larger than the threshold Lth (Yes), the control unit 15 shifts to step S114. When control unit 15 determines that the average luminance value Lav is not larger than the threshold Lth (No), the control unit 15 shifts to step S118.

When the control unit 15 shifts to step S114, the control unit 15 reduces the shortest exposure time Tmin by time set in advance and shifts to step S116. In other words, since the imaging environment is in a relatively bright state, the control unit 15 performs adjustment for reducing the shortest exposure time Tmin in order to obtain an image without a white void. As the time for reducing the shortest exposure time Tmin, an appropriate value may be calculated according to an average luminance value every time the shortest exposure time Tmin is reduced or values corresponding to the magnitude of the average luminance value may be prepared in advance as a table.

In step S116, the control unit 15 recalculates the intermediate exposure time Tmid using the shortest exposure time Tmin reduced in step S114 and the longest exposure time Tmax initially set and generates exposure ratio information on the basis of the reduced shortest exposure time Tmin and the longest exposure time Tmax initially set. Specifically, the control unit 15 generates "T1:T2:T3=Tmin (reduced):Tmid (recalculated):Tmax (initial)" as exposure ratio information. (Reduced), (recalculated), and (initial) attached after the exposure times respectively indicate that the exposure time is an exposure time after reduction adjustment, the exposure time is an exposure time after recalculation, and the exposure time is exposure time initially set. Further, the control unit 15 generates an exposure signal on the basis of the generated exposure ratio information. The control unit 15 outputs the generated exposure ratio information to the image combining unit 14, transmits the generated exposure signal and various control signals to the imaging element 10, and shifts to step S104.

On the other hand, when, in step S112, the average luminance value Lav is equal to or smaller than the threshold Lth and the control unit 15 shifts to step S118, the control unit 15 compares the average luminance value Lav calculated in step S110 and the threshold Lt1 on the low luminance side of the average luminance value set in advance. The control unit 15 determines, on the basis of a result of the comparison, whether the average luminance value Lav is smaller than the threshold Lt1. When the control unit 15 determines that the average luminance value Lav is smaller than the threshold Lt1 (Yes), the control unit 15 shifts to step S120. When the control unit 15 determines that the average luminance value Lav is not smaller than the threshold Lt1 (No), the control unit 15 shifts to step S124.

When the control unit 15 shifts to step S120, the control unit 15 increases the longest exposure time Tmax by time set in advance and shifts to step S122. Since the imaging environment is in a relatively dark state, the control unit 15 performs adjustment for increasing the longest exposure time Tmax in order to obtain an image without a black solid. As the time for increasing the longest exposure time Tmax, an appropriate value may be calculated according to an average luminance value every time the longest exposure time Tmax is increased or values corresponding to the magnitude of the average luminance value may be prepared in advance as a table.

In step S122, the control unit 15 recalculates the intermediate exposure time Tmid using the longest exposure time Tmax increased in step S120 and the shortest exposure time Tmin initially set and generates exposure ratio information on the basis of the shortest exposure time Tmin initially set and the increased longest exposure time Tmax. The exposure ratio information is "T1:T2:T3=Tmin (initial):Tmid (recalculated):Tmax (increased)". (Increased) attached after the exposure time Tmax indicates that the exposure time is an exposure time after increase adjustment. Further, the control unit 15 generates an exposure signal on the basis of the generated exposure ratio information. The control unit 15 outputs the generated exposure ratio information to the image combining unit 14, transmits the generated exposure signal and various control signals to the imaging element 10, and shifts to step S104.

When, in step S118, the average luminance value Lav is equal to or larger than the threshold Lt1 and the control unit 15 shifts to step S124, the control unit 15 sets normal exposure times as the shortest exposure time Tmin and the longest exposure time Tmax and shifts to step S126. In this embodiment, exposure times initially set are set as the normal exposure times.

In step S126, the control unit 15 recalculates the intermediate exposure time Tmid using the shortest exposure time Tmin and the longest exposure time Tmax set in step S124 and generates exposure ratio information on the basis of the recalculated intermediate exposure time Tmid, the shortest exposure time Tmin initially set, and the increased longest exposure time Tmax. The exposure ratio information is "T1:T2:T3=Tmin (initial):Tmid (recalculated):Tmax (initial)". Further, the control unit 15 generates an exposure signal on the basis of the generated exposure ratio information. The control unit outputs the generated exposure ratio information to the image combining unit 14, transmits the generated exposure signal and various control signals to the imaging element 10, and shifts to step S104.

Figure 7:
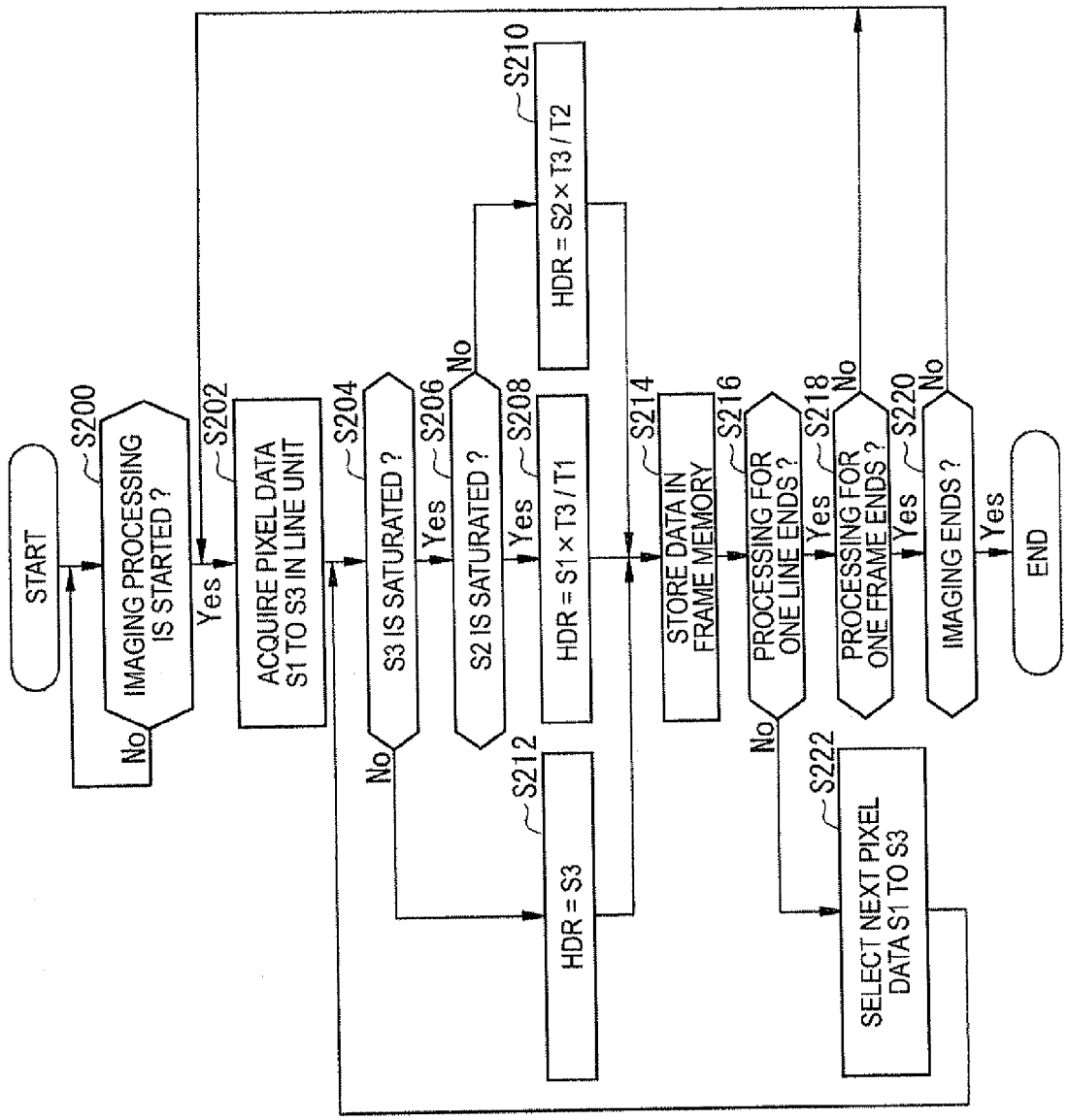
FIG. 7 is a flowchart for explaining HDR combination processing in an image combining unit.

A flow of the HDR combination processing in step S106 is explained with reference to FIG. 7. FIG. 7 is a flowchart for explaining the HDR combination processing in the image combining unit 14.

When the HDR combination processing is started in step 6106, as shown in FIG. 7, first the image combining unit 14 shifts to step S200.

In step S200, the HDR-signal processing unit 14a determines whether imaging processing is started. When the HDR-signal processing unit 14a determines that the imaging processing is started (Yes), the HDR-signal processing unit 14a transmits various control signals to the imaging element 10. The image combining unit 14 shifts to step S202. When the HDR-signal processing unit 14a determines that the imaging processing is not started (No), the HDR-signal processing unit 14a repeats the determination processing until the imaging processing is started.

When the image combining unit 14 shifts to step S202, the HDR-signal processing unit 14a acquires the pixel data S1 to S3 for one line from the memories 11 to 13. The image combining unit 14 shifts to step S204.

Specifically, at timing when the pixel data S1 to S3 for one line in the same pixel position are stored in the memories 11 to 13, the HDR-signal processing unit 14a acquires the pixel data S1 to S3.

In this embodiment, the pixel data S1 to S3 are data including information concerning luminance (luminance values) and position information of the pixels (position information of rows and columns). It is also possible that the pixel data S1 to S3 do not have the position information and the HDR-signal processing unit 14a counts a horizontal synchronization signal and a pixel clock to generate position information of the pixels.

The preprocess unit of the HDR-signal processing unit 14a applies fixed pattern noise removal processing and clamp processing to the acquired pixel data S1 to S3.

In step S204, the HDR-signal processing unit 14a compares the luminance value of the pixel data S3 and a luminance value for saturation determination set in advance. The HDR-signal processing unit 14a determines, from a result of the comparison, whether the pixel data S3 is saturated. When the HDR-signal processing unit 14a determines that the pixel data S3 is saturated (Yes), the image combining unit 14 shifts to step S206. When the HDR-signal processing unit 14a determines that the pixel data S3 is not saturated (No), the image combining unit 14 shifts to step S212.

When the image combining unit 14 shifts to step S206, the HDR-signal processing unit 14a compares the luminance value of the pixel data S2 and the luminance value for saturation determination. The HDR-signal processing unit 14a determines, from a result of the comparison, whether the pixel data S2 is saturated. When the HDR-signal processing unit 14a determines that the pixel data S2 is saturated (Yes), the image combining unit 14 shifts to step S208. When the HDR-signal processing unit 14a determines that the pixel data S2 is not saturated (No), the image combining unit 14 shifts to step S210.

When the image combining unit 14 shifts to step S208, the HDR-signal processing unit 14a multiplies the pixel data S1 (the luminance value) by a coefficient "T3/T1" and calculates a pixel value HDR of HDR pixel data. The image combining unit 14 shifts to step S214.

On the other hand, when the image combining unit 14 shifts to step S210, the HDR-signal processing unit 14a multiplies the pixel data S2 (the luminance value) by a coefficient "T3/T2" and calculates the pixel value HDR of the HDR pixel data. The image combining unit 14 shifts to step S214.

When, in step S204, the pixel data S3 is not saturated and the image combining unit 14 shifts to step S212, the HDR-signal processing unit 14a selects the pixel data S3 as the pixel value HDR of the HDR pixel data. The image combining unit 14 shifts to step S214.

In step S214, the HDR-signal processing unit 14a stores the HDR pixel data in the frame memory 14b via the memory IF. The image combining unit 14 shifts to step S216.

In step S216, the HDR-signal processing unit 14a determines whether the HDR combination processing ends for all pixel data for one line. When the HDR-signal processing unit 14a determines that the HDR combination processing ends (Yes), the image combining unit 14 shifts to step S218. When the HDR-signal processing unit 14a determines that the HDR combination processing does not end (No), the image combining unit 14 shifts to step S222.

When the image combining unit 14 shifts to step S218, the HDR-signal processing unit 14a determines whether the HDR combination processing ends for all pixel data for one frame. When the HDR-signal processing unit 14a determines that the HDR combination processing ends (Yes), the image combining unit 14 shifts to step S220. When the HDR-signal processing unit 14a determines that the HDR combination processing does not end (No), the image combining unit 14 shifts to step S202.

When the image combining unit 14 shifts to step S220, the HDR-signal processing unit 14a determines whether imaging ends. When the HDR-signal processing unit 14a determines that the imaging ends (Yes), the image combining unit 14 ends the series of processing. When the HDR-signal processing unit 14a determines that the imaging does not end (No), the image combining unit 14 shifts to step S202.

When, in step S216, the HDR combination processing for one line does not end and the image combining unit 14 shifts to step S222, the image combining unit 14 selects the next pixel data S1 to S3 not subjected to the HDR combination processing and shifts to step S204.

Operation in this embodiment is explained below with reference to FIGS. 8A to 8G and FIG. 9.

FIGS. 8A to 8C are diagrams showing response signals S1 to S3 to incident lights in the exposure times T1 to T3 determined such that ratios of the response signals S1 to S3 are equal. FIGS. 8D to 8F are diagrams the response signals shown in FIGS. 8A to 8C multiplied by coefficients. FIG. 8G is a diagram of an image signal obtained by combining the response signals shown in FIGS. 8D to 8F. FIG. 9 is a diagram representing axes of the incident lights in FIGS. 8A to 8C with logarithms.

When a power supply is turned on in the imaging device 1, before imaging processing is started, the control unit 15 generates exposure ratio information and an exposure signal, outputs the generated exposure ratio information to the image combining unit 14, and transmits the generated exposure signal and various control signals to the imaging element 10.

Specifically, first, according to an instruction from the user via the operation unit 17, the control unit 15 sets initial values of the exposure times T1 and T3 (step S100). It is assumed that "T1=2 H and T3=500 H" are set as the initial values.

The control unit 15 calculates, according to Formula (2), the intermediate exposure time T2 having a relation "T2/T1=T3/T2" (step S102). Specifically, since "T1=2 H and T3=500 H" are set, the control unit 15 automatically calculates "T2=2×(500/2)$^{1/2}$≡2×15.8=31.6". The calculation result is rounded off to set T2 to "32". Consequently, "T2/T1=32/2=16" and "T3/T2=500/32≡15.6" are obtained. Exposure ratio information "T1:T2:T3=2:32:500" in which ratios of exposures are substantially equal can be obtained.

Further, the control unit 15 generates an exposure signal including information of the exposure ratio information "T1:T2:T3=2:32:500", outputs the generated exposure ratio information to the image combining unit 14, and transmits the generated exposure signal and various control signals to the imaging element 10.

Consequently, the information concerning the exposure time ratio "T1:T2:T3=2:32:500" is written in the register of the HDR sensor 10*d* of the imaging element 10.

Subsequently, when the imaging element 10 starts imaging of a subject, light reflected from the subject is collected by the lens 10*a* and made incident on the micro lenses 10*b*. The incident light from the lens 10*a* is parallelized by the micro lenses 10*b* and made incident on the pixels of the sensor cell array 56 via the color filter array 10*c*.

On the other hand, when imaging is started (step S104), the HDR sensor 10*d* sets the reset line R line by line in order from a start line and resets accumulated charges in the pixels. Subsequently, the HDR sensor 10*d* sets, for the respective scanning lines, the nondestructive readout line L1 at timing when the exposure time T1 elapses after the reset of the pixels and reads out the pixel signal S1 of light response shown in FIG. 8A. The HDR sensor 10*d* sets, for the respective scanning lines, the nondestructive readout line L2 at timing when the exposure time T2 elapses after the reset of the pixels and reads out the pixel signal S2 of light response shown in FIG. 8B. The HDR sensor 10*d* sets the readout and reset line L3&R from the start line, reads out the pixel signal S3 of light response shown in FIG. 8C, and thereafter resets the accumulated charges in the pixels.

The pixel signals S1 to S3 obtained by performing the imaging in the exposure times T1, T2, and T3 in which the ratios are substantially equal as explained above are arranged at substantially equal intervals in a graph in which the incident lights are represented by logarithms as shown in FIG. 9.

Thereafter, while the imaging is performed, the setting of the nondestructive readout line L1, the nondestructive readout line L2 for performing nondestructive readout of a pixel signal in the exposure time T2, and the readout and reset line L3&R, the readout of the pixel signals S1 to S3, and the reset processing are repeatedly performed.

The pixel signals S1 to S3 read out in this way are stored in the first to third line memories for each of the lines and output to the selection circuit in a line unit. The analog pixel data S1 to S3 are output to the ADC in order of S1 to S3. The ADC converts the analog pixel data S1 to S3 into the digital pixel data S1 to S3. The ADC sequentially outputs the pixel data S1 to S3 to the memories 11 to 13 in a line unit and in order of S1 to S3.

On the other hand, when the pixel data S1, S2, and S3 for one line are respectively stored in the memories 11, 12, and 13, the HDR-signal processing unit 14*a* starts the HDR combination processing (step S106).

When the HDR combination processing is started (Yes in step S200), the HDR-signal processing unit 14*a* acquires the pixel data S1 to S3 for one line from the memories 11 to 13 (step S202). The preprocess unit applies the fixed pattern noise removal processing and the clamp processing to the acquired pixel data S1 to S3.

Subsequently, the HDR-signal processing unit 14*a* selects the pixel data S1 to S3 in the same pixel position not subjected to the determination processing and compares, first, the selected pixel data S3 and a luminance value for saturation determination Ssat (e.g., Ssat=250). It is assumed that luminance values of the selected pixel data S1 to S3 are "S1=62, S2=224, and S3=255". In this case, since "S3(255)>Ssat (250)", the HDR-signal processing unit 14*a* determines that the pixel data S3 is saturated (Yes in step S204). Since the pixel data S3 is saturated, the HDR-signal processing unit 14*a* compares the pixel data S2 and the luminance value for saturation determination Ssat. Since "S2(224)<Ssat(250)", the HDR-signal processing unit 14*a* determines that the pixel data S2 is not saturated (No in step S206). Since the pixel data S2 is not saturated, the HDR-signal processing unit 14*a* calculates a value (HDR)) of HDR pixel data in a selected pixel position using the pixel data S2. Specifically, as shown in FIG. 8E, the HDR-signal processing unit 14*a* calculates a coefficient "T3/T2" from the exposure times T3 and T2 during imaging and multiplies the pixel data S2 by the coefficient to calculate the HDR (step S210). In other words, "HDR=224 (S2)×500 H(T3)/32 H(T2)=3500".

The HDR-signal processing unit 14*a* stores the calculated value (HDR) of the HDR pixel data in memory areas of addresses corresponding to pixel positions of the frame memory 14*b* via the memory IF (step S214).

When the selected pixel data S1 to S3 are "S1=62, S2=255, and S3=255", since "S3(255)>Ssat(250)", the HDR-signal processing unit 14*a* determines that the pixel data S3 is saturated (Yes in step S204). Further, since "S2(255)>Ssat(250)", the HDR-signal processing unit 14*a* determines that the pixel data S2 is also saturated (Yes in step S206). Since both the pixel data S3 and S2 are saturated, the HDR-signal processing unit 14*a* calculates a value (HDR) of the HDR pixel data in the selected pixel position using the pixel data S1. Specifically, as shown in FIG. 8D, the HDR-signal processing unit 14*a* calculates a coefficient "T3/T1" from the exposure times T3 and T1 during imaging and multiplies the pixel data S1 by the coefficient to calculate the HDR (step S208). In other words, "HDR=62(S1)×500 H(T3)/2 H(T1)=15500".

The HDR-signal processing unit 14*a* stores the calculated HDR of the HDR pixel data in the memory areas of the addresses corresponding to the pixel positions of the frame memory 14*b* via the memory IF (step S214).

When the selected pixel data S1 to S3 are "S1=62, S2=124, and S3=221", since "S3(221)<Ssat(250)", the HDR-signal processing unit 14*a* determines that the pixel data S3 is not saturated (No in step S204). In this case, as shown in FIG. 8F, the HDR-signal processing unit 14*a* sets a value of the pixel data S3 as an HDR and stores the HDR in the memory areas of the addresses corresponding to the pixel positions of the frame memory 14b via the memory IF (step S214).

Since the HDR is calculated as explained above, the HDR pixel data of light response shown in FIG. 8G can be calculated. Wavy line portions shown in FIGS. 8D to 8G are noise portions that cause a pseudo contour or a false color. The imaging processing is performed with the ratios of the respective pairs of exposure times adjacent to each other set equal and images are combined by the combining method using the pixel signals S1 to S3 obtained by the imaging processing. This makes it possible to reduce signals in the noise portions used in the combination processing.

The HDR-signal processing unit 14a selects the next pixel data S1 to S3 not processed yet (No in step S216 and S222) and performs processing same as that explained above. When the processing ends for the pixel data S1 to S3 for one line (Yes in step S216), the HDR-signal processing unit 14a acquires the pixel data S1 to S3 in the next line and performs the same processing. When processing for all pixel data for one frame ends, the HDR-signal processing unit 14a determines whether the imaging processing ends. When the imaging processing continues (No in step S220), the HDR-signal processing unit 14a applies the series of processing (steps S202 to S222) to pixel data of the next frame. When the imaging processing ends (Yes in step S220), the HDR-signal processing unit 14a ends the series of processing.

On the other hand, when the HDR pixel data for one line or one frame is generated by the imaging processing and the imaging processing continues (No in step S108), the control unit 15 acquires the HDR pixel data for one line or the HDR pixel data for one frame from the frame memory 14b. The control unit 15 calculates, on the basis of the acquired pixel data, the average luminance value Lav for one line or one frame as statistic information concerning the brightness of the imaging environment (step S110). When the average luminance value Lav is calculated, the control unit 15 compares the average luminance value Lav and the threshold Lth on the high luminance side and determines whether the average luminance value Lav is larger than the threshold Lth. The threshold Lth on the high luminance side is "192" and the threshold Lt1 on the low luminance side is "64".

For example, when the average luminance value Lav is "61", since the average luminance value Lav (61) is smaller than the threshold Lth (192) (No in step S112), the control unit 15 compares the average luminance value Lav and the threshold Lt1 and determines whether the average luminance value Lav is smaller than the threshold Lt1. Since the average luminance value Lav (61) is smaller than the threshold Lt1 (64) (Yes in step S118), the control unit 15 determines that the imaging environment is dark and performs adjustment for increasing the longest exposure time "Tmax(T3)=500 H" presently set (step S120). For example, it is assumed that the longest exposure time is increased to "T3=1000 H". As a result, the substantially equal ratios are disordered, the control unit 15 substitutes "T1=2 H(initial) and T3=1000 H(increased)" in Formula (2) and recalculates the intermediate exposure time Tmid (T2). Consequently, "T2=2× $(1000/2)^{1/2} \cong 45$" is calculated. The control unit 15 generates "T1:T2:T3=2:45:1000" as new exposure ratio information and generates a new exposure information signal on the basis of the exposure ratio information. The control unit 15 outputs the generated exposure ratio information to the image combining unit 14 and transmits the generated exposure information signal to the imaging element 10 together with control signals. Consequently, the imaging element 10 performs imaging processing on the basis of the new exposure ratio information suitable for the brightness of the imaging environment.

When the calculated average luminance value Lav is "221", since the average luminance value Lav (221) is larger than the threshold Lth (192) (Yes in step S112), the control unit 15 determines that the imaging environment is bright and performs adjustment for reducing the shortest exposure time "Tmin (T1)=2 H" presently set (step S114). For example, it is assumed that the shortest exposure time is reduced to "T1=1 H". As a result, the substantially equal ratios are disordered, the control unit 15 substitutes "T1=1 H(reduced) and T3=500 H(initial)" in Formula (2) and recalculates the intermediate exposure time Tmid (T2). Consequently, "T2=1× $(500/1)^{1/2} \cong 22$" is calculated. The control unit 15 generates "T1:T2:T3=1:22:500" as new exposure ratio information and generates a new exposure information signal on the basis of the exposure ratio information. The control unit 15 outputs the generated exposure ratio information to the image combining unit 14 and transmits the generated exposure information signal to the imaging element 10 together with control signals. Consequently, the imaging element 10 performs imaging processing on the basis of the new exposure ratio information suitable for the brightness of the imaging environment.

As explained above, in the imaging device 1 according to this embodiment, the imaging element 10 can image the subject in the exposure times T1 to T3 corresponding to the exposures L1 to L3, the ratios "L2/L1" and "L3/L2" of respective pairs of exposures of which adjacent to each other are equal "L2/L1=L3/L2".

Consequently, since a ratio of exposures of the pixel data S1 to S3 used in the HDR combination processing is always fixed, it is possible to obtain a combined image having equal luminance over a dark section to a bright section and having little noise.

It is also possible to calculate the average luminance value Lav from the HDR pixel data for one line or one frame as statistic information concerning the brightness of the imaging environment, compare the average luminance value Lav with the threshold Lth on the high luminance side and the threshold Lt1 on the low luminance side, and determine a state of the brightness of the imaging environment.

It is also possible to perform adjustment for reducing the shortest exposure time Tmin (T1) when it is determined that the imaging environment is bright and perform adjustment for increasing the longest exposure time Tmax (T3) when it is determined that the imaging environment is dark.

Further, it is possible to reset the ratios disordered by the adjustment of the exposure times to be equal by recalculating the exposure time T2 according to Formula (2) using the adjusted exposure times T1 and T3 and the exposure times T1 and T3 initially set.

Consequently, it is possible to automatically adjust an exposure ratio (an exposure time ratio) to an exposure ratio suitable for the brightness of the imaging environment.

In the first embodiment, the imaging element 10 and the control unit 15 correspond to the imaging unit explained in the summary. The memories 11 to 13 and the imaging combining unit 14 correspond to the combining unit explained in the summary.

In the first embodiment, steps S100 to S104 and S110 to S126 correspond to the imaging step explained in the summary. Step 106 corresponds to the combining step explained in the summary.

Second Embodiment

Figure 10:
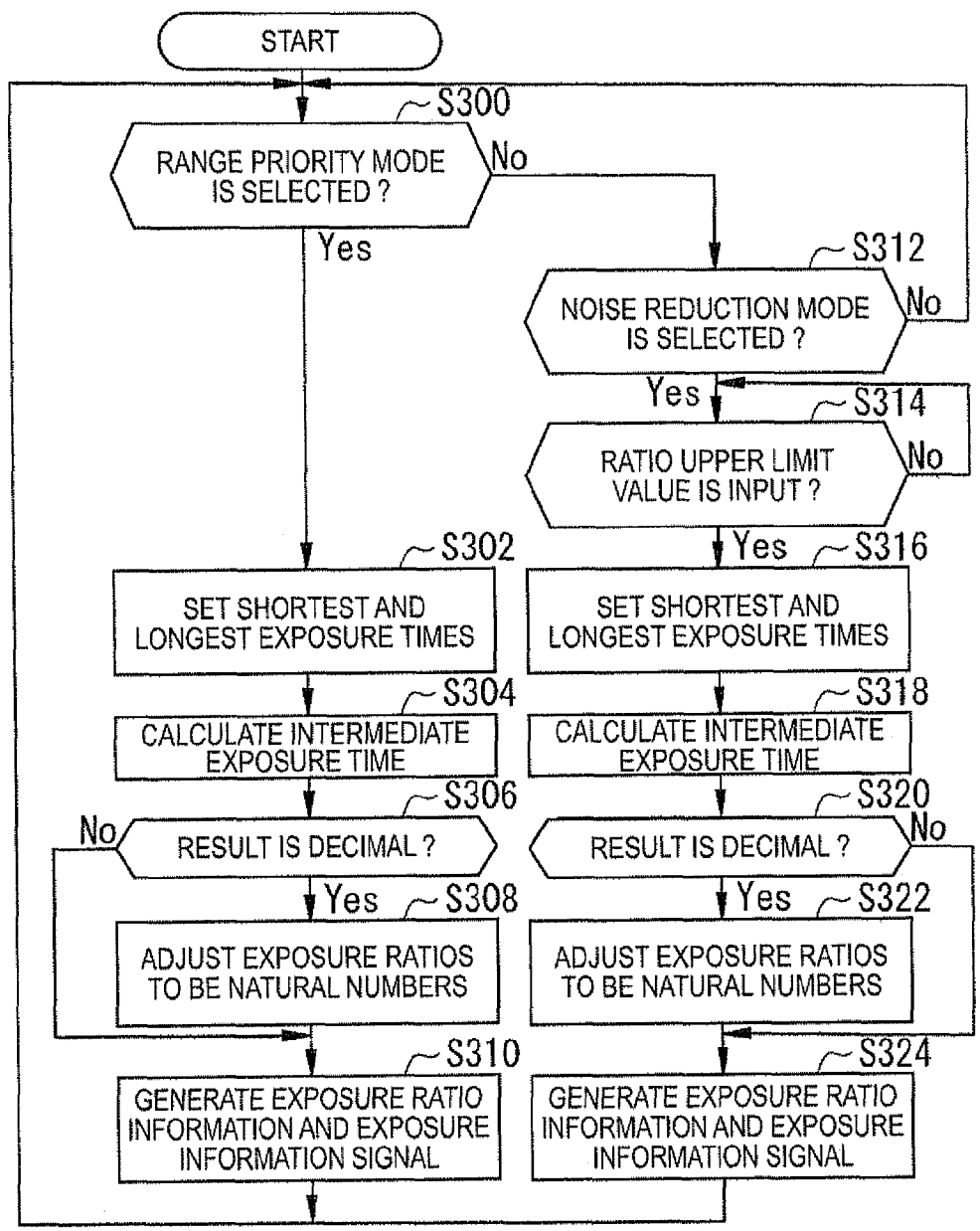
FIG. 10 is a flowchart for explaining exposure ratio information generation processing in a control unit.
Figure 11:
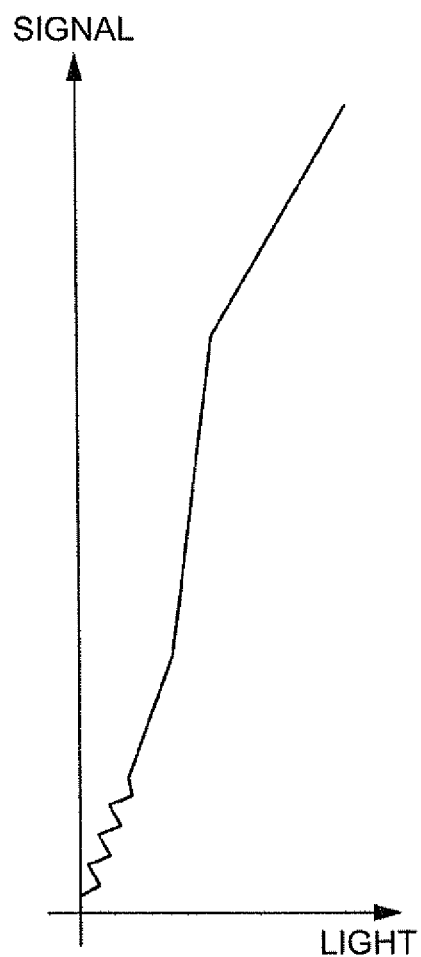
FIG. 11 is a diagram showing an example of a combined image signal obtained when linearity is distorted.

A second embodiment of the invention is explained below with reference to the accompanying drawings. FIG. 10 is a diagram showing the second embodiment of the imaging device, the imaging method, and the electronic apparatus according to the second embodiment of the invention.

This embodiment is different from the first embodiment in that the control unit 15 of the imaging element 10 according to the first embodiment selects, according to a selection instruction from a user via the operation unit 17, any one determination method out of plural kinds of determination methods (modes) for exposure ratio information and determines an exposure ratio (generates exposure ratio information) in the selected determination mode. This embodiment is also different from the first embodiment in that a calculated ratio of exposure times is adjusted such that all of the shortest exposure time T1, the intermediate exposure time T2, and the longest exposure time T3 are natural numbers.

Therefore, this embodiment is the same as the first embodiment except that a part of processing contents of the control unit 15 is different from that in the first embodiment.

The differences from the first embodiment are explained in detail below and explanation of similarities is omitted as appropriate.

The control unit 15 according to this embodiment has plural kinds of determination mode for exposure ratio information. The control unit 15 has a function of selecting any one determination mode on the basis of input information from the operation unit 17 and determining (generating) exposure ratio information in the selected determination mode. In this embodiment, as the determination mode, one of a range priority mode and a noise reduction mode can be selected.

Specifically, the range priority mode is a mode for determining an exposure ratio that makes best use of a dynamic range that can be expanded by HDR combination. When this mode is selected, the exposure times T1 and T3 having a maximum range are automatically set. When the dynamic range is "60 dB", T1=1 H and T3=1000 H are automatically set in the case where the exposure time is set in the range from 1 H to 1000 H. When the exposure times T1 and T3 are set, the exposure time T2 is calculated and an exposure ratio "T1:T2:T3" is determined by using Formula (2) in the first embodiment.

The noise reduction mode is a mode for determining an exposure ratio such that a ratio "T2/T1=T3/T2" is within an input range of an upper limit value. Specifically, noise that occurs in a boundary area is suppressed at the sacrifice of the width of the dynamic range. In this embodiment, when this mode is selected, the control unit 15 urges the user to input an upper limit of a ratio and the shortest exposure time T1 and the longest exposure time T3 and calculates the exposure time T2 using Formula (2) on the basis of the upper limit value input via the operation unit 17 and the exposure times T1 and T3 to determine the exposure ratio "T1:T2:T3".

Further, the control unit 15 according to this embodiment has a function of adjusting, for example, when a value calculated by Formula (2) is a decimal, on the basis of a result of the calculation, all exposure ratios to be natural numbers.

For example, it is assumed that the noise reduction mode is selected and a ratio upper limit value=16, T1=1, and T3=250 are input. In this case, when Formula (2) is applied, since T2=1×(250/1)$^{1/2}$≡15.8, T2 is a decimal. In such a case, values of T1 to T3 are adjusted such that, for example, T2/T1=T3/T2=16 (the ratio upper limit value) is obtained. For example, T1, T2, and T3 are respectively adjusted to 1, 16, and 256. Consequently, all exposure ratios are natural numbers and, in this case, are numbers that can be represented by powers of 2.

A flow of an exposure ratio information generation processing in the control unit 15 is explained with reference to FIG. 10, FIG. 10 is a flowchart for explaining the exposure ratio information generation processing in the control unit 15.

When the exposure ratio information generation processing is started, as shown in FIG. 10, first, the control unit 15 shifts to step S300.

In step S300, the control unit 15 determines, according to an input of a selection instruction by the user via the operation unit 17, whether the range priority mode is selected. When the control unit 15 determines that the range priority mode is selected (Yes), the control unit 15 shifts to step S302. When the control unit 15 determines that the priority mode is not selected (No), the control unit 15 shifts to step S308.

When the control unit 15 shifts to step S302, the control unit 15 sets the shortest exposure time Tmin and the longest exposure time Tmax according to a maximum range and shifts to step S304.

In step S304, the control unit 15 calculates the intermediate exposure time Tmid on the basis of the shortest exposure time Tmin and the longest exposure time Tmax set in step S302 and Formula (2) and shifts to step S306.

In step S306, the control unit 15 determines whether a result of the calculation in step S304 is a decimal. When the control unit 15 determines that the result is a decimal (Yes), the control unit 15 shifts to step S308. When the control unit 15 determines that the result is not a decimal (No), the control unit 15 shifts to step S310.

When the control unit 15 shifts to step S308, the control unit 15 adjusts, on the basis of the calculation result in step S304, all exposure ratios to be natural numbers. The control unit 15 shifts to step S310.

When the control unit 15 shifts to step S310, the control unit 15 generates exposure ratio information on the basis of the shortest exposure time Tmin and the longest exposure time Tmax set in step S302 and the intermediate exposure time Tmid calculated in step S304 or the shortest exposure time Tmin, the intermediate exposure time Tmid, and the longest exposure time Tmax adjusted in step S308. Further, the control unit 15 generates an exposure signal on the basis of the generated exposure ratio information. The control unit outputs the generated exposure ratio information to the image combining unit 14, transmits the generated exposure signal and various control signals to the imaging element 10, and shifts to step S300.

On the other hand, when the range priority mode is not selected in step S300 and the control unit 15 shifts to step S312, the control unit 15 determines whether the noise reduction mode is selected. When the control unit 15 determines that the noise reduction mode is selected (Yes), the control unit 15 displays, for example, a message for urging the user to input a ratio upper limit value on a not-shown liquid crystal screen and shifts to step S314. When the control unit 15 determines that the noise reduction mode is not selected (No), the control unit 15 shifts to step S300.

When the control unit 15 shifts to step S314, the control unit 15 determines whether a ratio upper limit value is input via the operation unit 17. When the control unit 15 determines that a ratio upper limit value is input (Yes), the control unit 15 displays, for example, a message for urging the user to input the shortest exposure time Tmin and the longest exposure time Tmax on the not-shown liquid crystal screen and shifts to step S316. When the control unit 15 determines that a ratio upper limit value is not input (No), the control unit 15 repeats the determination processing until a ratio upper limit value is input.

When the control unit 15 shifts to step S316, the control unit 15 sets the shortest exposure time Tmin and the longest exposure time Tmax on the basis of the ratio upper limit value input in step S314 and a dynamic range that can be expanded by HDR combination and shifts to step S318.

In step S318, the control unit 15 calculates the intermediate exposure time Tmid on the basis of the shortest exposure time Tmin and the longest exposure time Tmax set in step S316 and Formula (2) and shifts to step S320.

In step S320, the control unit 15 determines whether a result of the calculation in step S318 is a decimal. When the control unit 15 determines that the calculation result is a decimal (Yes), the control unit 15 shifts to step S322. When the control unit 15 determines that the calculation result is not a decimal (No), the control unit 15 shifts to step S324.

When the control unit 15 shifts to step S322, the control unit 15 adjusts, on the basis of the calculation result in step S314, all exposure ratios to be natural numbers and shifts to step S324.

When the control unit 15 shifts to step S324, the control unit 15 generates exposure ratio information on the basis of the shortest exposure time Tmin and the longest exposure time Tmax input in step S316 and the intermediate exposure time Tmid calculated in step S314 or the shortest exposure time Tmin, the intermediate exposure time Tmid, and the longest exposure time Tmax adjusted in step S322. The control unit 15 generates an exposure signal on the basis of the generated exposure ratio information. The control unit 15 outputs the generated exposure ratio information to the image combining unit 14, transmits the generated exposure signal and various control signals to the imaging element 10, and shifts to step S300.

Operation in this embodiment is explained below.

When a power supply is turned on and the imaging device 1 shifts to an initial setting mode according to the operation of the operation unit 17, the imaging device 1 displays a selection screen for a determination mode on a not-shown liquid crystal screen. The user operates the operation unit 17 according to screen guidance and selects a determination mode.

When the range priority mode is selected (Yes in step S300), the control unit 15 acquires, from the imaging element 10, information concerning setting of an exposure including information of a dynamic range of the imaging element 10. The control unit 15 sets the shortest exposure time Tmin and the longest exposure time Tmax on the basis of the acquired information (step S302). It is assumed that a dynamic range that can be expanded by HDR combination is 60 [dB] and a shortest exposure time of 1 H and a longest exposure time of 1000 H can be set.

Since the range priority mode is selected, the control unit 15 sets, giving priority to the width of a dynamic range, the shortest exposure time Tmin and the longest exposure time Tmax having a largest dynamic range. It is assumed that Tmin (T1)=1 H and Tmax (T3)=1000 H are set.

When the exposure time T1 and the exposure time T3 are set, the control unit 15 calculates, according to Formula (2), the intermediate exposure time T2 having a relation of "T2/T1=T3/T2" (step S304). Specifically, since "T1=1 H and T3=1000 H" are set, the control unit 15 automatically calculates "T2=1×(1000/1)$^{1/2}$≅31.6".

Since "31.6" is a decimal (Yes in step S306), the control unit 15 performs adjustment of an exposure ratio (step S308). In this embodiment, the control unit preferentially adjusts the exposure ratio to be a power of 2.

However, in the present case, if the exposure ratio is preferentially adjusted to be a power of two in such a manner as "T2/T1=T3/T2=32", the exposure time T3 is 1024 H and exceeds the maximum. Therefore, the exposure times T2 and T3 are adjusted to have a relation "T2/T1=T3/T2=31". Consequently, "T1:T2:T3=1:31:961" is determined (generated) as exposure ratio information.

Further, the control unit 15 generates an exposure signal including the exposure ratio information "T1:T2:T3=1:31:961", outputs the generated exposure ratio information to the image combining unit 14, and transmits the generated exposure signal and various control signals to the imaging element 10 (step S310).

Consequently, the information concerning the exposure time ratio "T1:T2:T3=1:31:961" is written in the register of the HDR sensor 10d of the imaging element 10.

On the other hand, when the noise reduction mode is selected on the selection screen for a determination mode (Yes in step S312), the control unit 15 displays a screen for urging the user to input a ratio upper limit value on the not-shown liquid crystal screen. The screen may be a screen for causing the user to select plural kinds of upper limit values or may be a screen on which the user directly inputs an arbitrary value. When a ratio upper limit value is input via the operation unit (Yes in step S314), the control unit 15 sets the shortest exposure time Tmin and the longest exposure time Tmax that keep the input ratio upper limit value. It is assumed that the ratio upper limit value=16 is input.

Specifically, the control unit 15 sets the exposure times T1 and T3 that can keep T3/T1≤16". It is assumed that T1=2 H and T3=500 H are set.

The control unit 15 calculates the intermediate exposure time T2 on the basis of the set exposure times T1 and T3 and Formula (2) (step S318).

Since "T1=2 H and T3=500 H" is set, the control unit 15 substitutes T1=2 H and T3=500 H in Formula (2) and calculates "T2=2×(500/2)$^{1/2}$≅31.6.

Since "31.6" is a decimal (Yes in step S320), the control unit 15 performs adjustment of an exposure ratio (step S322). In this embodiment, the control unit 15 preferentially adjusts the exposure ratio to be a power of 2. The control unit 15 adjusts, giving priority to a power of 2, T2=31.6 H to 32 H and adjusts T3=500 H to 512 H. Consequently, "T1:T2:T3=2:32:512" is determined (generated) as exposure ratio information. As a result, a dynamic range is 48 [dB]. However, for example, when an "S/N" of sensor cells themselves is not high, it is possible to reduce noise that occurs in a boundary area to be smaller than noise that occur in a maximum range.

Further, the control unit 15 generates an exposure signal including the exposure ratio information "T1:T2:T3=2:32:512", outputs the generated exposure ratio information to the image combining unit 14, and transmits the generated exposure signal and various control signals to the imaging element 10 (step S324).

Consequently, the information concerning the exposure time ratio "T1:T2:T3=2:32:512" is written in the register of the HDR sensor 10d of the imaging element 10.

The following operation of the imaging processing is the same as that in the first embodiment. Therefore, explanation of the operation is omitted.

As explained above, the imaging device 1 according to this embodiment can select one of the range priority mode and the noise reduction mode as the determination method for exposure ratio information.

When the range priority mode is selected, the control unit 15 determines an exposure time ratio corresponding to the exposures L1 to L3, the ratios "L2/L1" and "L3/L2" of which are equal, to maximize the dynamic range. When the noise reduction mode is selected, the control unit 15 determines an exposure time ratio corresponding to the exposures L1 to L3, the ratios "L2/L1" and "L3/L2" of which are equal, not to exceed an input radio upper limit value.

Consequently, in the range priority mode, an image represented by wide gradation can be obtained. In the noise reduction mode, an image having image quality with further reduced noise can be obtained.

When the exposure time T2 is a decimal in the calculation of the intermediate exposure time T2, the control unit 15 adjusts, on the basis of a result of the calculation, the exposure times T1 to T3 such that all exposure time ratios are natural numbers. The exposure time ratios can be adjusted to be preferentially a power of 2.

Consequently, it is possible to suppress occurrence of noise due to a rounding error and perform multiplication or the like with shift operation by calculating a power of 2. Therefore, it is possible to simplify a circuit configuration in the processing units.

In the second embodiment, the imaging element 10 and the control unit 15 correspond to the imaging unit explained in the summary. The memories 11 to 13 and the image combining unit 14 correspond to the combining unit explained in the summary.

In the second embodiment, the function of selecting a determination method (mode) of exposure ratio information by the operation unit 17 and the control unit 15 corresponds to the selecting unit explained in the summary.

In the second embodiment, the function of determining exposure ratio information on the basis of a selected determination method (the range priority mode or the noise reduction mode) corresponds to the exposure determining method explained in the summary.

In the second embodiment, the function of setting a shortest exposure time and a longest exposure time after selecting a determination method for exposure ratio information in the control unit 15 corresponds to the exposure setting unit explained in the summary.

The imaging device 1 in the embodiments can be combined with not-shown other devices such as a display device and a memory device to configure an electronic apparatus such as a digital camera or a digital video camera.

In the embodiments, three or more kinds of exposures, ratios of which are equal, are realized by controlling exposure times. However, a configuration for realizing the three or more kinds of exposures is not limited to this configuration. The three or more kinds of exposures may be realized by controlling an iris (an aperture), imaging sensitivity, or the like according to the functions of the imaging element 10.

In the embodiments, the method of determining an exposure time ratio for performing imaging with the three kinds of exposures, ratios of which are equal, is explained with reference to the several examples. However, the method of determining an exposure time ratio is not limited to the methods explained in the embodiments. For example, it is also possible to use a method of checking an actual S/N of the sensor cell array 56 and setting, on the basis of the S/N, an exposure time ratio to prevent noise from occurring in a connecting portion of images during combination.

In the second embodiment, as the determination method for exposure ratio information, the range priority mode and the noise reduction mode are explained as the examples. However, the determination method is not limited to these modes.

For example, it is also possible to use a method of causing a user to set an arbitrary dynamic range and any one of arbitrary exposure times T1 to T3 and determining the remaining two exposure times using Formula (2) on the basis of information concerning the setting. Specifically, when an arbitrary range is set and an arbitrary exposure time T1 is set, the remaining exposure times T2 and T3 are determined, when an arbitrary exposure time T2 is set, the remaining exposure times T1 and T3 are determined, and, when an arbitrary exposure time T3 is set, the remaining exposure times T1 and T2 are determined.

In the embodiments, the intermediate exposure time T2 is calculated by using Formula (2). However, a configuration for calculating the intermediate exposure time T2 is not limited to this configuration. For example, it is also possible to calculate the exposure time T2 with respect to predetermined exposure times T1 and T3 using Formula (2) and generate a data table (LUT) in advance and determine the exposure time T2 using the generated LUT.

In the embodiments, the HDR sensor 10d of the imaging element 10 includes the sensor cell array 56 configured by using the CMOS technique. However, a configuration of the HDR sensor 10d is not limited to this configuration. For example, the HDR sensor 10d may includes a sensor cell array including a CCD.

In the embodiments, the combination method shown in the flowchart of FIG. 7 is used in the HDR-signal processing unit 14a in the image combining unit 14. However, a combination method in the HDR-signal processing unit 14a is not limited to this combination method. Other combination methods can be used.

The embodiments are preferred specific examples of the invention. Various technically desirable limitations are applied to the embodiments. However, the scope of the invention is not limited to these embodiments as long as there is no specific description for limiting the invention in the above explanation. The drawings used in the above explanation are schematic diagrams in which longitudinal and lateral scales of members and portions are different from actual ones for convenience of illustration.

The invention is not limited to the embodiments. Modifications, improvements, and the like in a range in which the purpose of the invention can be attained are included in the invention.

What is claimed is:

1. An imaging device comprising:
   an imaging unit that images a subject with three or more kinds of exposures, ratios of respective pairs of exposures of which adjacent to each other in an ascending order or a descending order are equal;
   a combining unit that combines, on the basis of the ratios, pixel signals corresponding to the respective three or more kinds of exposures obtained by imaging the subject with the imaging unit; and
   an exposure adjusting unit that adjusts, on the basis of information concerning brightness of an imaging environment, while keeping the ratios of the respective pairs of exposures adjacent to each other equal, a control amount for an exposure of the imaging unit such that the three or more kinds of exposures are exposures suitable for the brightness of the imaging environment.

2. The imaging device according to claim 1, wherein, when the three or more kinds of exposures are represented as L1, L2, ..., and Ln (n is a natural number equal to or larger than 3 and L1<L2< ... <Ln), the imaging unit images the subject in exposure times T1, T2, ..., and Tn (T1<T2< ... <Tn) in which ratios of respective pairs of exposures adjacent to each other "L2/L1, ..., Ln/L(n−1)" are equal (L2/L1=... Ln/L(n−1)).

3. The imaging device according to claim 1, further comprising:

a selecting unit that selects any one determination method out of plural kinds of exposure determination methods for determining the three or more kinds of exposures; and an exposure determining unit that determines the three or more kinds of exposures on the basis of the determination method selected by the selecting unit, wherein the imaging unit images the subject with the three or more kinds of exposures determined by the exposure determining unit.

4. The imaging device according to claim 3, wherein the determination methods include a method of setting a maximum exposure and a minimum exposure among the three or more kinds of exposures, calculating an intermediate exposure of exposures, the ratios of the respective pairs of exposures adjacent to each of which are equal, on the basis of the set maximum exposure and minimum exposure, and determining the three or more kinds of exposures.

5. The imaging device according to claim 4, wherein, when the imaging device images the subject with the three kinds of exposures L1, L2, and L3 (L1<L2<L3), the exposure determining unit calculates the exposure L2, which is the intermediate exposure, according to the following Formula (1):

$$L2 = L1 \times (L3/L1)^{1/2} \quad (1).$$

6. The imaging device according to claim 1, further comprising:

an exposure setting unit that sets a maximum exposure and a minimum exposure among the three or more kinds of exposures; and an exposure determining unit that calculates, on the basis of the maximum exposure and the minimum exposure set by the exposure setting unit, an intermediate exposure of exposures, the ratios of the respective pairs of exposures adjacent to each of which are equal, and determines the three or more kinds of exposures.

7. An imaging method comprising:

imaging a subject with three or more kinds of exposures, ratios of respective pairs of exposures of which adjacent to each other in an ascending order or a descending order are equal;

combining, on the basis of the ratios, pixel signals corresponding to the respective three or more kinds of exposures obtained by imaging the subject; and adjusting, on the basis of information concerning brightness of an imaging environment, while keeping the ratios of the respective pairs of exposures adjacent to each other equal, a control amount for an exposure such that the three or more kinds of exposures are exposures suitable for the brightness of the imaging environment.

8. An electronic apparatus comprising the imaging device according to claim 1.

* * * * *